United States Patent
Kumasako et al.

(10) Patent No.: US 6,741,389 B2
(45) Date of Patent: May 25, 2004

(54) OPTICAL TRANSMISSION SYSTEM AND OPTICAL TRANSMISSION METHOD UTILIZING RAMAN AMPLIFICATION

(75) Inventors: Junichi Kumasako, Kawasaki (JP); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 14 days.

(21) Appl. No.: 10/093,818

(22) Filed: Mar. 11, 2002

(65) Prior Publication Data

US 2003/0099030 A1 May 29, 2003

(30) Foreign Application Priority Data

Nov. 29, 2001 (JP) .................................. 2001-365036
Feb. 27, 2002 (JP) .................................. 2002-050798

(51) Int. Cl.[7] .............................................. H01S 3/00
(52) U.S. Cl. ...................................................... 359/334
(58) Field of Search .............................. 359/341.32, 334, 359/349

(56) References Cited

U.S. PATENT DOCUMENTS

| | | | | |
|---|---|---|---|---|
| 6,310,716 B1 | * | 10/2001 | Evans et al. | 359/334 |
| 6,441,950 B1 | * | 8/2002 | Chen et al. | 359/334 |
| 6,452,715 B1 | * | 9/2002 | Friedrich | 359/334 |
| 6,456,426 B1 | * | 9/2002 | Bolshtyansky et al. | 359/334 |
| 6,510,000 B1 | * | 1/2003 | Onaka et al. | 359/334 |
| 6,529,316 B1 | * | 3/2003 | Treyz et al. | 359/337.11 |
| 6,532,101 B2 | * | 3/2003 | Islam et al. | 359/334 |
| 6,542,287 B1 | * | 4/2003 | Ye et al. | 359/334 |
| 6,594,071 B1 | * | 7/2003 | Gavrilovic et al. | 359/341.4 |
| 6,657,774 B1 | * | 12/2003 | Evans et al. | 359/334 |
| 2002/0122242 A1 | * | 9/2002 | Shimojoh | 359/334 |
| 2003/0021008 A1 | * | 1/2003 | Islam et al. | 359/334 |
| 2003/0067671 A1 | * | 4/2003 | Islam et al. | 359/337 |

OTHER PUBLICATIONS

Japanese Unexamined patent Pub. No. 10–200509, issued Jul. 31, 1998; Only Abstract Translated.
Japanese Unexamined patent Pub. No. 10–073852, issued Mar. 17, 1998; Translation–Abstract Only.
Japanese Unexamined patent Pub. No. 10–022931, issued Jan. 23, 1998; Translation Abstract Only.
Japanese Unexamined patent Pub. No. 2000–314902, issued Nov. 14, 2000; Translation Abstract Only.
Japanese Unexamined patent Pub. No. 2001–109025, issued Apr. 20, 2001; Translation Abstract Only.
Japanese Unexamined patent Pub. No. 11–084440, issued Mar. 26, 1999; Translation Abstract Only.

(List continued on next page.)

*Primary Examiner*—Thomas G. Black
*Assistant Examiner*—Deandra M. Hughes
(74) *Attorney, Agent, or Firm*—Staas & Halsey LLP

(57) ABSTRACT

The present invention aims at providing an optical transmission system for improving transmission characteristics, taking account of the nonlinear optical effect to be caused not only in an optical fiber transmission path wherein the distributed Raman amplification is performed but also in an amplifying medium wherein the discrete Raman amplification is performed, within an optical transmission device. To this end, the optical transmission system of the present invention controls, in each repeating section, the supplying conditions of pumping lights at a distributed Raman amplifier and a discrete Raman amplifier, based on signal light powers at a signal light input point to the optical fiber transmission path and a signal light output point from the optical fiber transmission path, and signal light powers at a signal light input point to a DCF (amplifying medium) and a signal light output point from the DCF within an optical repeater, so that an amount of nonlinear optical effect caused in one repeating section is brought to a required value or less.

16 Claims, 14 Drawing Sheets

OTHER PUBLICATIONS

Japanese Unexamined patent Pub. No. 2001–117126, issued Apr. 27, 2001; Translation Abstract Only.

Japanese Unexamined patent Pub. No. 2001–015845, issued Jan. 19, 2001; Translation Abstract Only.

Japanese Unexamined patent Pub. No. 2000–299522, issued Oct. 24, 2000; Translation Abstract Only.

Japanese Unexamined patent Pub. No. 2000–330145, issued Nov. 30, 2000; Translation Abstract Only.

* cited by examiner

OPTICAL TRANSMISSION SYSTEM AND OPTICAL TRANSMISSION METHOD UTILIZING RAMAN AMPLIFICATION

BACKGROUND OF THE INVENTION (1) Field of the Invention

The present invention relates to an optical transmission system and an optical transmission method for transmitting a signal light while amplifying the signal light by utilizing Raman amplification, and more particularly, to a technique for controlling the Raman amplification so as to suppress deterioration of transmission characteristics due to the nonlinear optical effect.

(2) Related Art

For example, in a wavelength-division multiplexing (WDM) optical transmission system for multiplexing a plurality of optical signals of mutually different wavelengths to transmit these multiplexed optical signals through a single optical fiber transmission path, it is important to densely multiplex optical signals of wavelengths (wavelength channels) as many as possible, so as to increase a transmission capacity of the optical transmission system. However, there is a possibility that, as a result of densely multiplexing the wavelength channels, the nonlinear optical effect, such as four wave mixing or cross phase modulation, occurs in the optical fiber transmission path, so that the inter-channel interference is caused by an influence of the nonlinear optical effect, to thereby deteriorate the transmission characteristics. In order to avoid such deterioration of transmission characteristics, it is effective to reduce an input light power to an optical fiber, to thereby suppress the occurrence of nonlinear optical effect. However, this brings a reduction of optical signal-to-noise ratio (OSNR), thereby causing a possibility of deteriorating the transmission characteristics.

As conventional technique to suppress the aforementioned deterioration of transmission characteristics, there has been proposed a technique, as disclosed in Japanese Unexamined Patent Publication No. 2000-330145, in which, in an optical repeater provided with a typical optical amplifier, a pumping light is supplied to an optical fiber transmission path that is connected to the optical repeater, to perform distributed Raman amplification, so that an output light power from the optical repeater, i.e., an input light power to an optical fiber transmission path at the latter repeating section, is reduced to thereby decrease the influence of nonlinear optical effect. Further, in Japanese Unexamined Patent Publication No. 2000-299522, there has been proposed an optical transmission system in which the distributed Raman amplification using an optical fiber transmission path as an amplifying medium is combined with discrete Raman amplification in an amplifying medium within an optical repeater. Such a system using both of the distributed Raman amplification and discrete Raman amplification is considered to be more effective to suppress deterioration of transmission characteristics due to the nonlinear optical effect to be caused in the optical fiber transmission path.

For optical transmission systems utilizing the Raman amplification, in addition to the above techniques, various techniques have been proposed. Japanese Unexamined Patent Publication No. 10-73852 discloses an optical repeating transmission system provided with optical components for Raman amplification within an optical repeater so as to compensate for a loss in transmission path. Further, Japanese Unexamined Patent Publication No. 10-22931 discloses an optical amplifying transmission system that Raman amplifies a signal light being propagated through a transmission path, by pumping lights of a plurality of wavelengths, to make a signal band to be a broad band. Moreover, Japanese Unexamined Patent Publication No. 2000-314902 discloses a distributed Raman amplifier in which a power difference is caused between a pumping light at a shorter wavelength side and a pumping light at a longer wavelength side, in order to solve the wavelength dependence of the OSNR. Additionally, Japanese Unexamined Patent Publication No. 2001-109025 has proposed a method for reducing a gain fluctuation in a Raman amplifier and for reducing a gain variation for each gain medium fiber.

Furthermore, Japanese Unexamined Patent Publication No. 11-84440 discloses an optical transmission system capable of providing a flat and wide gain band and of compensating for dispersion of transmission path, by combining a Raman amplifying section with a rare earth element doped fiber amplifying section. Further, Japanese Unexamined Patent Publication No. 2001-15845 discloses a technique to automatically control an output level to be constant in a case of performing the distributed Raman amplification.

Meanwhile, in the aforementioned optical transmission system that uses both of the distributed Raman amplification and discrete Raman amplification, it is effective to utilize, as an amplifying medium for causing the discrete Raman amplification within the optical repeater, a medium such as a dispersion compensation fiber having a larger non-linearity and a higher Raman amplifying efficiency, compared with a typical optical fiber transmission path to be connected to an optical repeater. In a case where the discrete Raman amplification is to be used using the dispersion compensation fiber, in order to effectively suppress the transmission characteristic deterioration due to the nonlinear optical effect caused in the entire system, it is necessary to design the system, taking account of not only the influence of nonlinear optical effect caused in the optical fiber transmission path and the like, but also the influence of nonlinear optical effect caused in the dispersion compensation fiber and the like within the optical repeater.

In the aforementioned prior art, although the transmission characteristic deterioration due to the nonlinear optical effect caused in the optical fiber transmission path is reducible, there is not considered the influence of nonlinear optical effect caused in the optical repeater within which the discrete Raman amplification is conducted. Therefore, there is a problem that it is difficult to reliably suppress the transmission characteristic deterioration to be caused in the entire system or each repeating section as a unit.

Concerning techniques for suppressing the nonlinear optical effect caused in an optical fiber transmission path, in Japanese Unexamined Patent Publication No. 10-200509, there is disclosed an optical transmission system that sets a gain per unit length of a distributed amplifying medium on an optical fiber transmission path, so that the maximum intensity of WDM signal light is less than a defined value for causing the nonlinear optical effect. Although this optical transmission system is not applied with the discrete Raman amplification in an optical repeater, the controlling method to be set here for suppressing the nonlinear optical effect considers only the nonlinear optical effect caused in the optical fiber transmission path. Thus, even by this system, it is also difficult to effectively suppress the nonlinear optical effect caused in the entire system or each repeating section.

There will be described in detail hereinafter the influence of nonlinear optical effect in an optical transmission system using both of the distributed Raman amplification and discrete Raman amplification, while showing a specific calculation example.

FIG. 22 is a block diagram showing an example of a WDM optical transmission system using both of the distributed Raman amplification and discrete Raman amplification.

In the WDM optical transmission system of FIG. 22, for example, optical signals of different wavelengths generated at a plurality of optical senders (OSs) are wavelength multiplexed by a multiplexer, and transmitted to an optical fiber transmission path comprising a single mode fiber (SMF), to be sent towards optical receivers (ORs). Here, as the WDM signal light to be transmitted, it is assumed to include optical signals of 40 waves ($\lambda 1$ to $\lambda 40$) arranged in a C-band (for example, a wavelength band between 1529 nm and 1561 nm) at intervals of 100 GHz. A plurality of optical repeaters are arranged on the optical fiber transmission path at intervals of 100 km, while each optical fiber transmission path between adjacent optical repeaters is supplied with a 1.45 $\mu$m band pumping light that is propagated in a direction opposite to the WDM signal light. Each optical repeater is constituted of a discrete Raman amplifier using a dispersion compensation fiber (DCF) as an amplifying medium and an erbium doped fiber amplifier (EDFA) combined with each other. For the SMF to be used for the optical fiber transmission path, there are supposed transmission parameters: a loss to the signal wavelength (1.55 $\mu$m band) being 0.25 dB/km; a loss to the excitation wavelength (1.45 $\mu$m band) being 0.50 dB/km; an effective area being 80 $\mu m^2$; a nonlinear refractive index being $2.9 \times 10^{-20}$ $m^2/W$; a dispersion coefficient to the signal wavelength being 17 ps/nm/km; and a dispersion slope being 0.057 $ps/nm^2/km$, so that each chromatic dispersion caused in the optical fiber transmission path of each repeating section is compensated for by 100% by means of the DCF within each optical repeater.

Concerning the case where the above system model and parameters are assumed, FIG. 23 shows a calculation result of an OSNR within one repeating section and a nonlinear phase shift amount caused in the repeating section relative to a pumping light power for the discrete Raman amplification within each optical repeater. Note, the signal light power in the optical fiber transmission path and the noise light power accompanying the Raman amplification are obtained by numerically solving relational equations described in an article: H. Kidorf et al., "Pump interactions in a 100-nm bandwidth Raman amplifier", IEEE Photonics Technol. Lett., 11, 530–532 (1999). Further, the nonlinear phase shift amount is calculated, in accordance with the relationship represented by the following equation (1):

$$\Delta \phi_{NL} = \frac{2\pi}{\lambda} \cdot \int \frac{n_2(z) \cdot P(z)}{A_{\textit{eff}}(z)} dz \quad (1)$$

wherein $\Delta \phi_{NL}$ represents a nonlinear phase shift amount; $n_2(z)$ represents a nonlinear refractive index; $A_{\textit{eff}}(z)$ represents an effective area; and $P(z)$ represents an optical power at a position "z".

As shown in the calculation result of FIG. 23, it can be understood that, although it becomes possible to obtain an excellent OSNR by increasing the pumping light power for the discrete Raman amplification, the nonlinear phase shift amount is also increased. The nonlinear phase shift amount can be regarded as a parameter corresponding to the amount of nonlinear optical effect caused in one repeating section. Thus, it is assumed that, with the increase of this parameter, the influence of a self phase modulation (SPM) and a cross phase modulation (XPM) or the like is increased, thereby causing waveform degradation to thereby bring deterioration of transmission characteristics.

SUMMARY OF THE INVENTION

The present invention has been achieved in view of the above problems, and it is therefore an object of the present invention to provide a controlling technique for improving transmission characteristics in an optical transmission system and an optical transmission method using both of the distributed Raman amplification and discrete Raman amplification, while taking account of nonlinear optical effect to be caused in each repeating section including not only an optical fiber transmission path but also a discrete Raman amplifying medium within each optical transmission device.

To achieve the above object, the present invention provides an optical transmission system utilizing Raman amplification, which comprises a distributed Raman amplifying section that supplies a pumping light to an optical fiber transmission path to Raman amplify a signal light being propagated through the optical fiber transmission path, and a discrete Raman amplifying section that supplies a pumping light to an amplifying medium within an optical transmission device connected to the optical fiber transmission path to Raman amplify a signal light being propagated through the amplifying medium, wherein the optical transmission system further comprises a controlling device that controls the supplying conditions of the pumping lights at the distributed Raman amplifying section and the discrete Raman amplifying section, based on signal light powers at a signal light input point to the optical fiber transmission path and a signal light output point from the optical fiber transmission path, and signal light powers at a signal light input point to the amplifying medium within the optical transmission device and a signal light output point from the amplifying medium within the optical transmission device.

According to the optical transmission system having such a constitution, the supplying conditions of the pumping lights for the distributed Raman amplification and discrete Raman amplification are controlled, based on the signal light powers at the signal light input/output points of the optical fiber transmission path on which the distributed Raman amplification is performed and the signal light powers at the signal light input/output points of the amplifying medium of the optical transmission device in which the discrete Raman amplification is performed, thereby enabling to control the Raman amplification taking account of an influence of nonlinear optical effect caused not only in the optical fiber transmission path but also in the amplifying medium within the optical transmission device.

As a specific constitution of the optical transmission system, the controlling device may comprise a signal light power detecting section that detects signal light powers at the respective points, and a controlling section that controls the powers or wavelengths of the pumping lights to be supplied by the distributed Raman amplifying section and the discrete Raman amplifying section, so that the signal light powers at the respective points detected by the signal light power detecting section approach control target values of signal light powers for the respective points, respectively, which bring an amount of nonlinear optical effect caused in a transmission section including the optical fiber transmission path and the amplifying medium within the optical transmission device to a previously set value or less.

According to the optical transmission system having such a constitution, the signal light powers at the respective points are controlled so as to suppress the amount of nonlinear optical effect caused in the transmission section including the optical fiber transmission path and the amplifying medium within the optical transmission device to a required value or less. Thus, it becomes possible to avoid an increase of nonlinear optical effect accompanying the Raman amplification, to thereby obtain an excellent OSNR.

In the optical transmission system, the optical transmission device may include an optical amplifying section that amplifies the signal light Raman amplified by the discrete Raman amplifying section, and the controlling device may also control an amplifying operation of the optical amplifying section, based on the signal light powers at the respective points. This enables an increased output of the optical transmission device.

Further, in the optical transmission system, the distributed Raman amplifying section may multiplex a plurality of pumping lights of different wavelengths, to supply the multiplexed pumping light to the optical fiber transmission path, the discrete Raman amplifying section may multiplex a plurality of pumping lights of different wavelengths, to supply the multiplexed pumping light to the amplifying medium within the optical transmission device, and the controlling device may control the powers or wavelengths of the pumping lights, so that a gain wavelength characteristic of the Raman amplification by the discrete Raman amplifying section approaches a characteristic reverse to a gain wavelength characteristic of the Raman amplification by the distributed Raman amplifying section.

According to such a constitution, it becomes possible to flatten a Raman gain in one transmission section, by the combination of the distributed Raman amplifying section and discrete Raman amplifying section.

The present invention further provides an optical transmission method utilizing the Raman amplification for supplying a pumping light to an optical fiber transmission path to perform the distributed Raman amplification on a signal light being propagated through the optical fiber transmission path, and for supplying a pumping light to an amplifying medium within an optical transmission device connected to the optical fiber transmission path to perform the discrete Raman amplification on a signal light being propagated through the amplifying medium within the optical transmission device, wherein the supplying conditions of the pumping lights for the distributed Raman amplification and for the discrete Raman amplification are controlled, based on signal light powers at a signal light input point to the optical fiber transmission path and a signal light output point from the optical fiber transmission path, and signal light powers at a signal light input point to the amplifying medium within the optical transmission device and a signal light output point from the amplifying medium within the optical transmission device.

Further objects, features and advantages of the present invention will become more apparent from the following description of preferred embodiments when read in conjunction with the accompanying drawings.

DETAILED DESCRIPTION OF THE INVENTION

There will be described hereinafter embodiments according to the present invention, with reference to the accompanying drawings.

Figure 1:
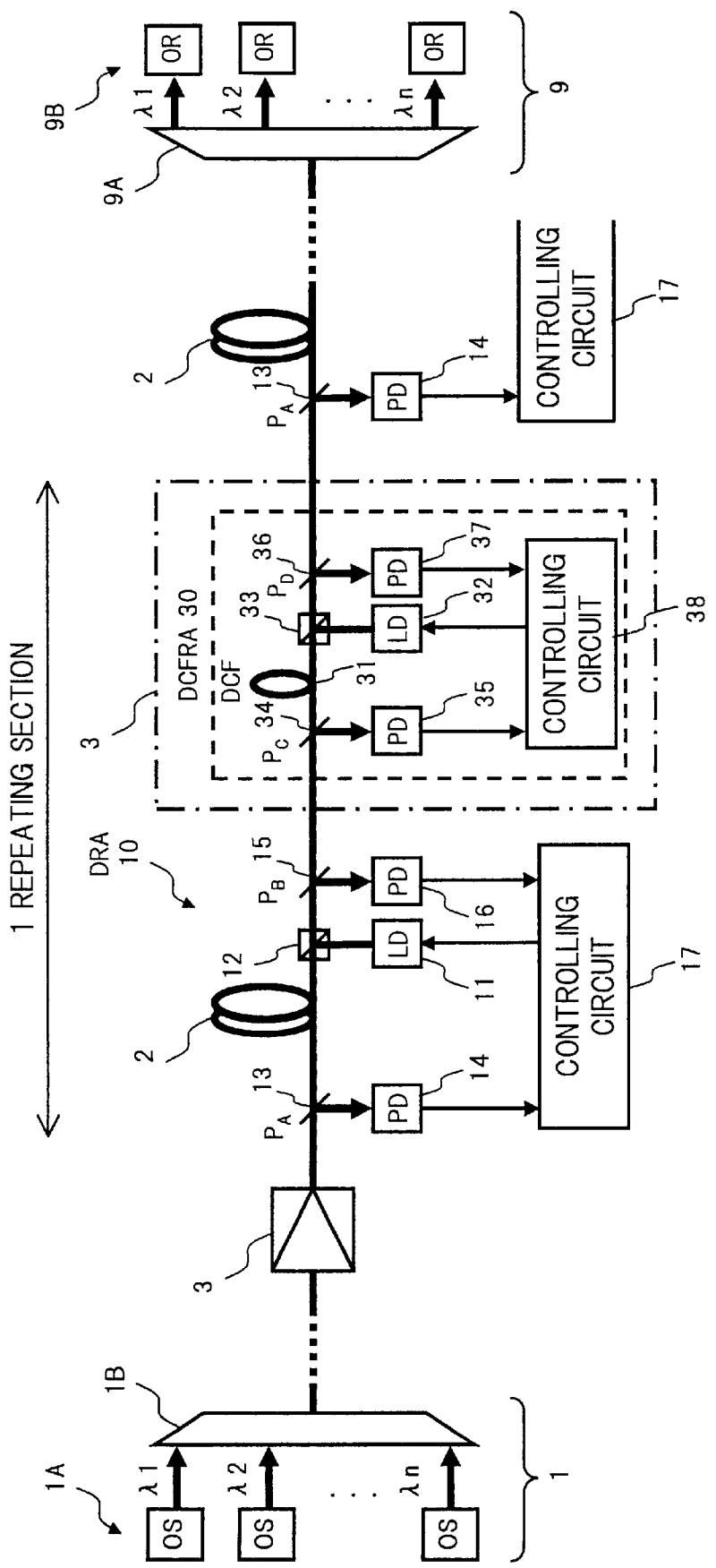
FIG. 1 is a block diagram showing a constitution of a WDM optical transmission system using the Raman amplification according to a first embodiment of the present invention.

FIG. 1 is a block diagram showing a constitution of a WDM optical transmission system using the Raman amplification according to a first embodiment of the present invention.

In FIG. 1, for the present WDM optical transmission system having a system structure in which a WDM signal light generated at an optical sending device 1 is transmitted to an optical fiber transmission path 2, and is repeated and transmitted to an optical receiving device 9, while being amplified by optical repeaters 3 acting as optical transmission devices, that are arranged at required intervals on the optical fiber transmission path 2, there is provided with distributed Raman amplifiers (DRA) 10 using the optical fiber transmission path 2 as an amplifying medium, corresponding to the optical repeaters 3, while each optical repeater 3 includes a discrete Raman amplifier (DCFRA) 30 using a dispersion compensation fiber (DCF) 31 within the optical repeater 3. Further, the operation setting of the DRA 10 and optical repeater 3 in each repeating section is controlled so that an amount of nonlinear optical effect caused in one repeating section becomes a previously set value or less, based on input and output optical powers of the optical fiber transmission path 2 and input and output optical powers of the DCFRA 30.

The optical sending device 1 is a known one that multiplexes optical signals of wavelengths $\lambda 1$ to $\lambda n$ generated by a plurality of optical senders (OSs) 1A by a multiplexer 1B, to transmit to the optical fiber transmission path 2. As the optical fiber transmission path 2, it is possible to use a typical optical fiber, such as, a 1.3 $\mu$m zero dispersion single mode fiber (SMF), a dispersion-shifted fiber (DSF) or a non-zero dispersion shifted fiber (NZ-DSF).

Each DRA 10 includes, for example, a pumping light source (LD) 11, a multiplexer 12, demultiplexers 13 and 15, a light receiver (PDs) 14 and 16, and a controlling circuit 17. The pumping light source 11 generates a pumping light in a wavelength band capable of amplifying, due to the Raman effect, a WDM signal light being propagated through the optical fiber transmission path 2. The wavelength band of this pumping light is set based on such a characteristic that the Raman amplification has a gain peak at a frequency lower, by 13.2 THz, than the frequency of the pumping light. Specifically, for example, it is possible to effectively amplify a WDM signal light in a 1.55 $\mu$m band, by using a 1.45 $\mu$m band pumping light source. The multiplexer 12 is to supply the pumping light output from the pumping light source 11, to the optical fiber transmission path 2. Here, the multiplexer 12 is inserted into a position near an input end of the optical repeater 3 on the optical fiber transmission path 2, so that the pumping light is supplied to the optical fiber transmission path 2 so as to be propagated in a direction opposite to the propagation direction of the WDM signal light.

The demultiplexer 13 and light receiver 14 are to monitor an optical power at a signal light input point $P_A$ of the optical fiber transmission path 2 corresponding to one repeating section. Specifically, the demultiplexer 13 is inserted onto the optical fiber transmission path 2, positioned near an output end of the optical repeater 3 belonging to a former stage repeating section, and branches a part of the WDM signal light output from the optical repeater 3 at former stage, to transmit the branched light, as a monitor light, to the light receiver 14. The light receiver 14 receives the monitor light from the demultiplexer 13, and outputs an electrical signal corresponding to an optical power of the monitor light, to the controlling circuit 17. Further, the demultiplexer 15 and light receiver 16 are to monitor an optical power at a signal light output point $P_B$ of the optical fiber transmission path 2 corresponding to one repeating section. Specifically, the demultiplexer 15 is inserted onto the optical fiber transmission path 2 positioned between the multiplexer 12 and an input end of the optical repeater 3, and branches a part of the WDM signal light that has been propagated through the optical fiber transmission path 2 to be Raman amplified, to transmit the branched light, as a monitor light, to the light receiver 16. The light receiver 16 receives the monitor light from the demultiplexer 15, and outputs an electrical signal corresponding to an optical power of the monitor light, to the controlling circuit 17. The controlling circuit 17 obtains an optical power per one wavelength channel at each of the signal light input point $P_A$ and signal light output point $P_B$, by using the output signals from the light receivers 14 and 16, to control an output state of the pumping light from the pumping light source 11 based on the optical powers at the points $P_A$ and $P_B$, as will be described later.

The DCFRA 30 constituting the optical repeater 3 includes, for example, the DCF 31, a pumping light source (LD) 32, a multiplexer 33, demultiplexers 34 and 36, light receivers (PDs) 35 and 37, and a controlling circuit 38. The DCF 31 is to compensate for the chromatic dispersion and dispersion slope of the optical fiber transmission path 2 connected to the input end of the optical repeater 3. This DCF 31 has a greater non-linearity compared with the aforementioned SMF or the like to be used for the optical fiber transmission path 2, thereby enabling to obtain a higher Raman amplifying efficiency.

Similarly to the pumping light source 11 of the DRA 10, the pumping light source 32 generates a pumping light in a wavelength band suitable for the WDM signal light, to supply the pumping light to the DCF 31 via the multiplexer 33. Herein, the multiplexer 33 is connected to an output end of the DCF 31 so that the pumping light is supplied to the DCF 31, so as to be propagated in a direction opposite to the propagation direction of the WDM signal light.

The demultiplexer 34 and light receiver 35 are to monitor an optical power at a signal light input point $P_C$ of the DCF 31. Specifically, the demultiplexer 34 is connected to an input end of the DCF 31, and branches a part of the WDM signal light input to the DCF 31, to transmit the branched light, as a monitor light, to the light receiver 35. The light receiver 35 receives the monitor light from the demultiplexer 34, and outputs an electrical signal corresponding to an optical power of the monitor light, to the controlling circuit 38. Further, the demultiplexer 36 and light receiver 37 are to monitor an optical power at a signal light output point $P_D$ of the DCF 31. Specifically, the demultiplexer 36 is inserted into a latter stage of the multiplexer 33, and branches a part of the WDM signal light that has been propagated through the DCF 31 to be Raman amplified, to transmit the branched light, as a monitor light, to the light receiver 37. The light receiver 37 receives the monitor light from the demultiplexer 36, and outputs an electrical signal corresponding to an optical power of the monitor light, to the controlling circuit 38. The controlling circuit 38 obtains an optical power per one wavelength channel at each of the signal light input point $P_C$ and signal light output point $P_D$, by using the output signals from the light receivers 35 and 37, to control an output state of the pumping light from the pumping light source 32 based on the optical powers at the points $P_C$ and $P_D$, as will be described later.

Herein, the demultiplexers 13 and 15, and light receivers 14 and 16 of the DRA 10 and the demultiplexers 34 and 36, and light receivers 35 and 37 of the DCFRA 30 cooperatively function as a signal light power detecting section, while the controlling circuit 17 of the DRA 10 and controlling circuit 38 of the DCFRA 30 cooperatively function as a controlling section.

The optical receiving device 9 is a known one that demultiplexes the WDM signal light output from the optical fiber transmission path 2 into optical signals of respective wavelength channels, by a demultiplexer 9A, to perform a receiving process of these optical signals by corresponding optical receivers 9B, respectively.

There will be described hereinafter an operation of the WDM optical transmission system of the first embodiment.

Generally, it is assumed that the optical fiber transmission path 2 and optical repeater 3 of each repeating section to be used in the WDM optical transmission system are to be replaced or altered, due to breakage of optical fiber, trouble of equipment, upgrade of system or the like. For example, if the length of the optical fiber transmission path 2 or the type of optical fiber to be used is altered, since the characteristics of transmission loss, chromatic dispersion or the like relative to a WDM signal light are changed, it is required to adjust the gain setting, chromatic dispersion compensating amount or the like of each optical repeater 3.

Figure 23:
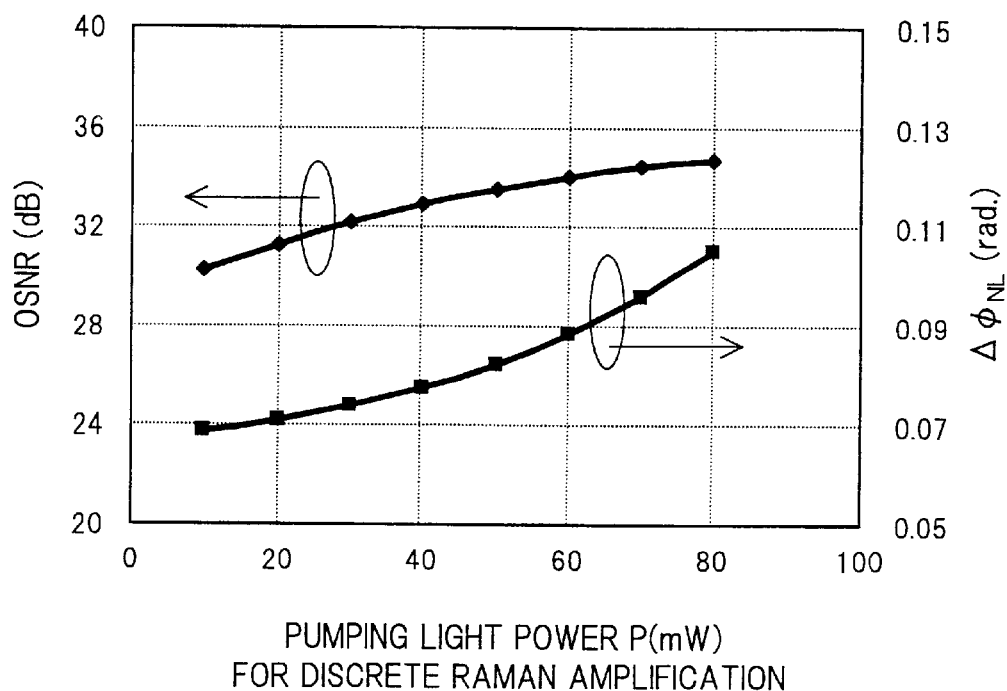
FIG. 23 is a diagram showing a calculation result of an OSNR and a nonlinear phase shift amount within one repeating section, to a pumping light power for the discrete Raman amplification, for the conventional WDM optical transmission system of FIG. 22.

In such a case, in the system structure that utilizes both of the DRA 10 using the optical fiber transmission path 2 as an amplifying medium, and the DCFRA 30 using the DCF 31 within the optical repeater 3 as an amplifying medium, the OSNR and the nonlinear phase shift amount $\Delta\phi_{NL}$ within one repeating section are changed in a trade-off manner relative to the pumping light power for the discrete Raman amplification as previously shown in FIG. 23. Therefore, it is required to perform the operation setting of the DRA 10 and optical repeater 3, taking account of an influence of the nonlinear optical effect to be caused in the entire optical path of one repeating section including the optical fiber transmission path 2 and DCF 31. In other words, as in the conventional manner, even if the optimization of the OSNR is attempted by taking account of only the influence of the nonlinear optical effect caused in the optical fiber transmission path 2, there is a possibility that the nonlinear optical effect in the DCF 31 is increased to bring deterioration of waveform. Therefore, it is important to suppress the occurrence of nonlinear optical effect in both of the optical fiber transmission path 2 and DCF 31 within one repeating section.

Therefore, in the WDM optical transmission system of this embodiment, attention has been paid to the signal light input point $P_A$ and signal light output point $P_B$ of the optical fiber transmission path 2 as well as the signal light input point $P_C$ and signal light output point $P_D$ of the DCF 31, and the pumping light powers for the DRA 10 and DCFRA 30 are controlled by the controlling circuits 17 and 38, respectively, based on the optical powers at the points $P_A$, $P_B$, $P_C$ and $P_D$, so that the amount of nonlinear optical effect (here, nonlinear phase shift amount $\Delta\phi_{NL}$) caused in one repeating section becomes a previously set value or less. Note, it is possible to appropriately set an upper limit value of the amount of nonlinear optical effect, corresponding to transmission characteristics required in the system.

Figure 2:
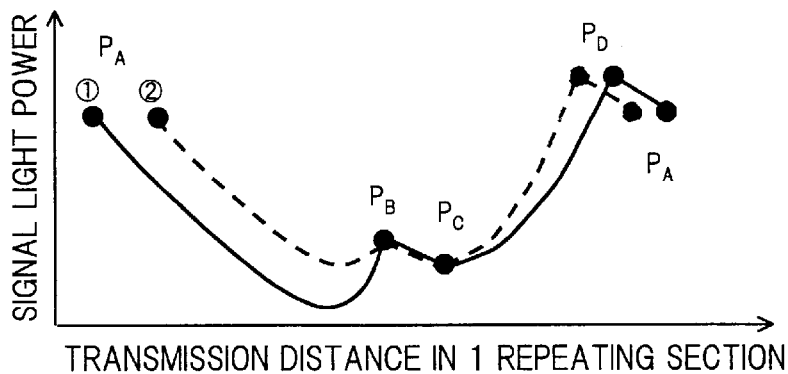
FIG. 2 is a diagram showing a change in signal light levels at respective points when the length of optical fiber transmission path of one repeating section is changed in the first embodiment.

FIG. 2 shows an example of level diagram corresponding to the points $P_A$ to $P_D$, in the WDM transmission system of this embodiment, when controlling the nonlinear phase shift amount $\Delta\phi_{NL}$ to be a previously set value or less in a certain repeating section, in a case where the length of the optical fiber transmission path 2 in this repeating section is shortened, and with this, the length of the DCF 31 in the optical repeater 3 is also shortened. The signal light power per one channel at each of points $P_A$ to $P_D$ is controlled from a state ① indicated by a solid line in FIG. 2 to a state ② indicated by a broken line, by adjusting the pumping light power of the DRA 10 and the pumping light power of the DCFRA 30 corresponding to the shortening of the optical fiber transmission path 2 and DCF 31, so that the nonlinear phase shift amount $\Delta\phi_{NL}$ to be caused in this repeating section is controlled to be a previously set value or less before and after the change from the state ① to the state ②, to thereby suppress the deterioration of transmission characteristics due to the nonlinear optical effect.

Figure 3:
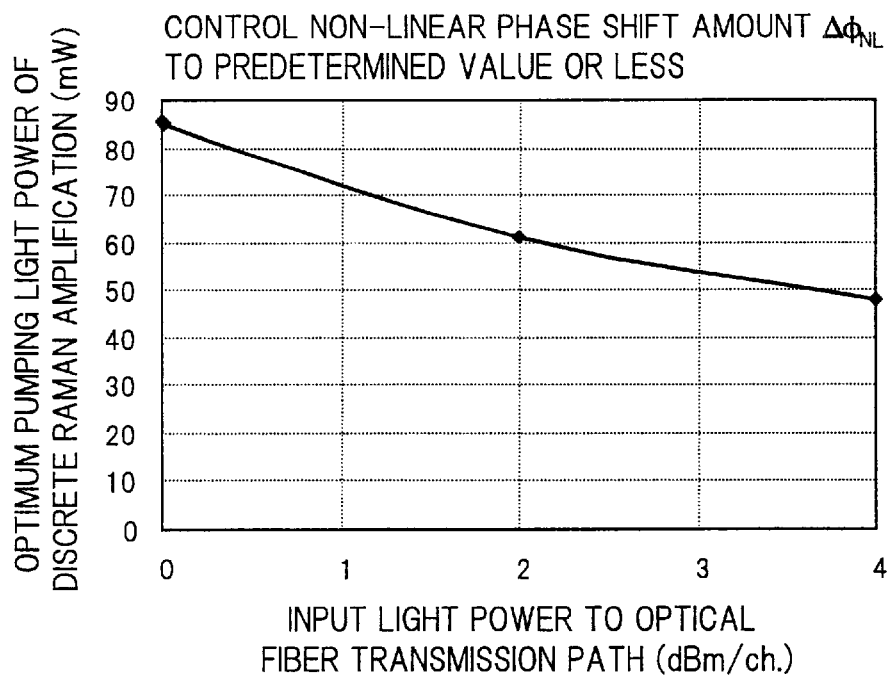
FIG. 3 is a graph showing a relationship of an optimum pumping light power of discrete Raman amplification to an input light power to the optical fiber transmission path, when a nonlinear phase shift amount is controlled to a previously set value or less.

As a specific method for realizing the aforementioned control, in the WDM optical transmission system of this embodiment, firstly conditions for bringing the nonlinear phase shift amount $\Delta\phi_{NL}$ to a previously set value or less are obtained based on the relationship represented by the aforementioned equation (1), in accordance with characteristic parameters of the optical fiber transmission path 2 and DCF 31 to be used. Next, in order to enable to ensure a maximum OSNR in one repeating section after satisfying the aforementioned conditions, the gain allocation between the distributed Raman amplification and discrete Raman amplification is optimized such as by obtaining a relationship of an optimum pumping light power for the discrete Raman amplification to an input light power into the optical fiber transmission path 2, for example, as shown in FIG. 3. Then, in accordance with the obtained gain allocation, signal light powers corresponding to the points $P_A$ to $P_D$ are calculated, and the calculation results are stored, as control target values, in the controlling circuit 17 of the DRA 10 and in the controlling circuit 38 of the DCFRA 30.

At the controlling circuits 17 and 38, actual signal light powers at the points $P_A$ to $P_D$ are judged based on the output signals from the light receivers 14 and 16, and 35 and 37, respectively. Then, the pumping light powers output from the pumping light sources 11 and 32 are feedback controlled so that the signal light powers at the points $P_A$ to $P_D$ approach the control target values, to thereby optimize the gains of the distributed Raman amplification and discrete Raman amplification. In this way, it becomes possible to ensure the maximum OSNR, while holding the nonlinear phase shift amount $\Delta\phi_{NL}$ caused in one repeating section to a previously set value or less.

According to the WDM optical transmission system of the first embodiment, since the aforementioned control is performed for each repeating section, it is possible to obtain an excellent OSNR in the entire system while avoiding an increase of nonlinear optical effect accompanied by the Raman amplification in the entire system, to thereby ensure an excellent transmission quality.

In the first embodiment, there has been described a system structure in which the optical sending device 1 and optical receiving device 9 are connected to the opposite ends of the optical fiber transmission path 2, respectively. However, the present invention is not limited thereto, and can be applied to such a system structure corresponding to a ring-shaped optical network. Further, there has been assumed each optical repeater 3 on the optical fiber transmission path 2, as an optical transmission device for performing the discrete Raman amplification. However, it is also possible to perform the discrete Raman amplification, by using, as amplifying mediums, such as dispersion compensation fibers provided in the optical receiving device 9, in addition to each optical repeater.

Moreover, the pumping lights to be supplied to the optical fiber transmission path 2 and DCF 31 have been set, to be propagated in directions opposite to the propagation direction of the signal light. However, the pumping lights may be propagated in the same directions as the propagation direction of the signal light. Additionally, the DRA 10 and the DCFRA 30 have been constituted to supply the pumping lights generated by the individual pumping light sources 11 and 32 to the amplifying mediums, respectively. However, instead of each of pumping light sources 11 and 32, it is possible to adopt a constitution such that pumping lights generated by a plurality of pumping light sources of different wavelengths, are multiplexed, to supply the multiplexed pumping light to the amplifying mediums. The constitution using such a plurality of pumping light sources will be specifically described in the later embodiments.

There will be described hereinafter a WDM optical transmission system according to a second embodiment of the present invention.

Figure 4:
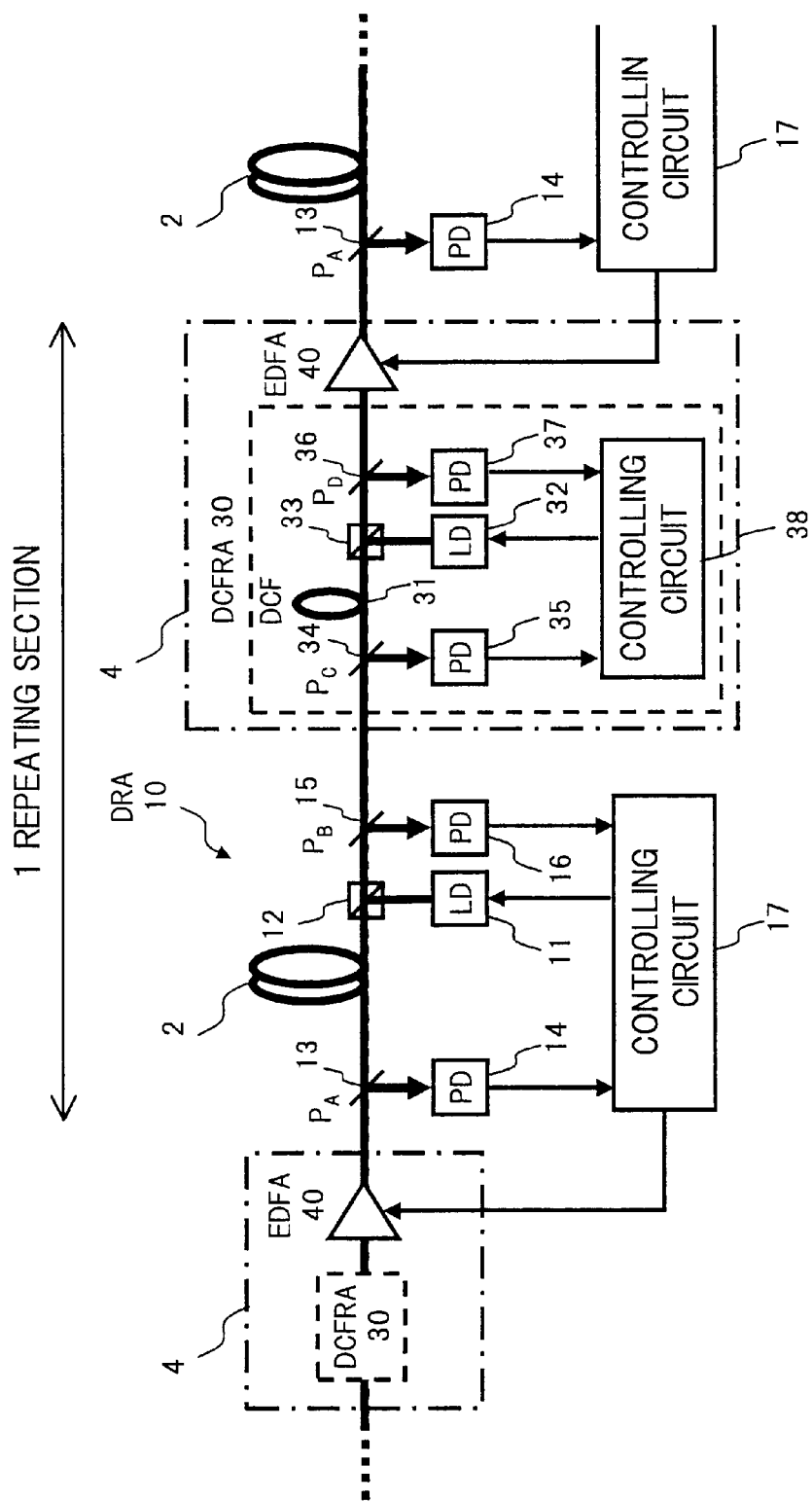
FIG. 4 is a block diagram showing an essential constitution of a WDM optical transmission system according to a second embodiment of the present invention.

FIG. 4 is a block diagram showing an essential constitution of a WDM optical transmission system according to the second embodiment. Same components as those in the first embodiment shown in FIG. 1 are denoted by the same reference numerals and the descriptions thereof shall be omitted. Same rules shall be applied to the other embodiments.

The WDM optical transmission system of this embodiment in FIG. 4 is constituted such that, for the system structure of the first embodiment, instead of the optical repeater 3 comprising the DCFRA 30 of each repeating section, there is provided an optical repeater 4 added with an EDFA 40 at a latter stage of the DCFRA 30, so that the WDM signal light being propagated through one repeating section is amplified sequentially by the DRA 10, DCFRA 30 and EDFA 40. The constitution of portions other than the above are the same as the first embodiment.

The EDFA 40 within the optical repeater 4 has an input end connected to an output end of the DCFRA 30, and an output end connected to a signal light input end of an optical fiber transmission path 2 at latter stage. Although not shown in the figure, since this EDFA 40 includes an erbium doped fiber (EDF) supplied with a pumping light in a required wavelength band to be excited, the WDM signal light output from the DCFRA 30 is amplified to a required level by induced emission caused when such WDM signal light is propagated through the EDF, to be output. Herein, the amplifying operation of the EDFA 40 is assumed to be controlled by a controlling signal to be notified from the controlling circuit 17 of the DRA 10 arranged in the repeating section at latter stage. As such an EDFA 40, it is possible to adopt an EDFA having a known constitution. Although the EDFA has been adopted herein, it is possible to alternatively provide, at the latter stage of the DCFRA 30, an optical fiber amplifier doped with a rare earth element other than erbium, or a semiconductor amplifier.

In the WDM optical transmission system having the above constitution, optical powers at the signal light input/output points $P_A$ and $P_B$ of the optical fiber transmission path 2 and optical powers at the signal light input/output points $P_C$ and $P_D$ of the DCF 31, are monitored in each repeating section, similarly to the first embodiment. Then, the pumping light powers output from the pumping light source 11 of the DRA 10 and from the pumping light source 32 of the DCFRA 30 are feedback controlled by the controlling circuits 17 and 38, respectively, and the amplifying operation of the EDFA 40 is feedback controlled by the controlling circuit 17 of the DRA 10 at the next stage, so that the signal light powers at the points $P_A$ to $P_D$ approach the control target values capable of bringing the nonlinear phase shift amount $\Delta\phi_{NL}$ caused in one repeating section to a previously set value or less, and also ensuring the maximum OSNR. In this way, the gains of the DRA 10, DCFRA 30 and EDFA 40 are optimized, to thereby effectively suppress the occurrence of nonlinear optical effect accompanied by the Raman amplification.

As described above, according to the WDM optical transmission system of the second embodiment, even in a system structure in which the WDM signal light is amplified by the DRA 10 and the optical repeater 4 constituted by combining DCFRA 30 and EDFA 40, to be transmitted, in each repeating section, it becomes possible to obtain the same effect as the first embodiment, and also to attain the increased output level of optical repeater 4.

There will be described hereinafter a WDM optical transmission system according to a third embodiment of the present invention.

The WDM optical transmission system of the third embodiment is an improved example of the second embodiment, such that the DCFRA of the optical repeater 4 in each repeating section has a two-staged structure, so as to improve the amplifying characteristics of the discrete Raman amplification.

Figure 5:
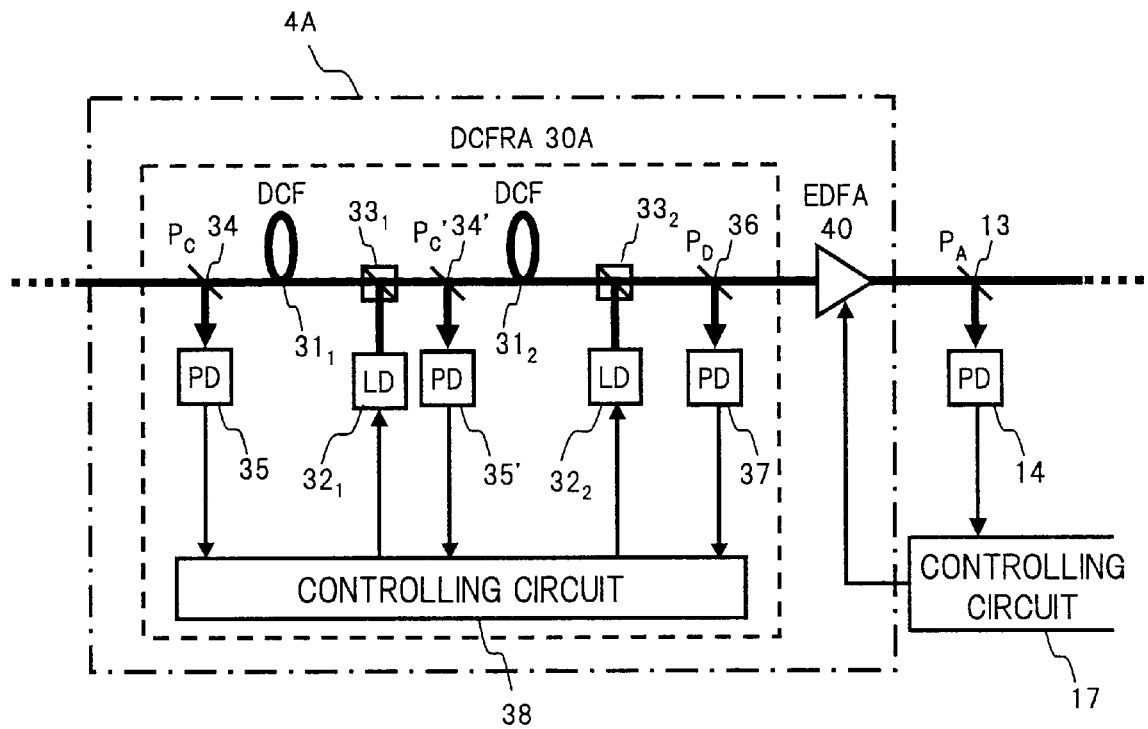
FIG. 5 is a block diagram showing a constitution of an optical repeater to be used in a WDM optical transmission system of a third embodiment of the present invention.

FIG. 5 is a block diagram showing a constitution of an optical repeater to be used in the WDM optical transmission system of the third embodiment.

In FIG. 5, an optical repeater 4A of this embodiment includes a two-staged DCFRA 30A, and an EDFA 40 connected to a latter stage of the DCFRA 30A. The DCFRA 30A includes two DCFs $31_1$, $31_2$ set at required lengths, respectively, as will be described later, such that pumping lights output from pumping light sources (LDs) $32_1$, $32_2$ are supplied to the DCFs $31_1$ and $31_2$ via multiplexers $33_1$ and $33_2$, respectively. The DCFRA 30A is provided with a demultiplexer 34 and a light receiver (PD) 35, for monitoring an optical power at a signal light input point $P_C$ of the former stage DCF $31_1$, a demultiplexer 34' and a light receiver (PD) 35', for monitoring an optical power at a signal light output point $P_C'$ of the former stage DCF $31_1$, i.e., at a signal light input point $P_C'$ of the latter stage DCF $31_2$, and a demultiplexer 36 and a light receiver (PD) 37, for monitoring an optical power at a signal light output point $P_D$ of the latter stage DCF $31_2$, such that output signals from the light receivers 35, 35' and 37 are sent to the controlling circuit 38 that controls the pumping light powers output from the pumping light sources $32_1$ and $32_2$, respectively.

There will be briefly described hereinafter advantages to be obtained by using the two-staged DCFRA 30A.

Figure 6:
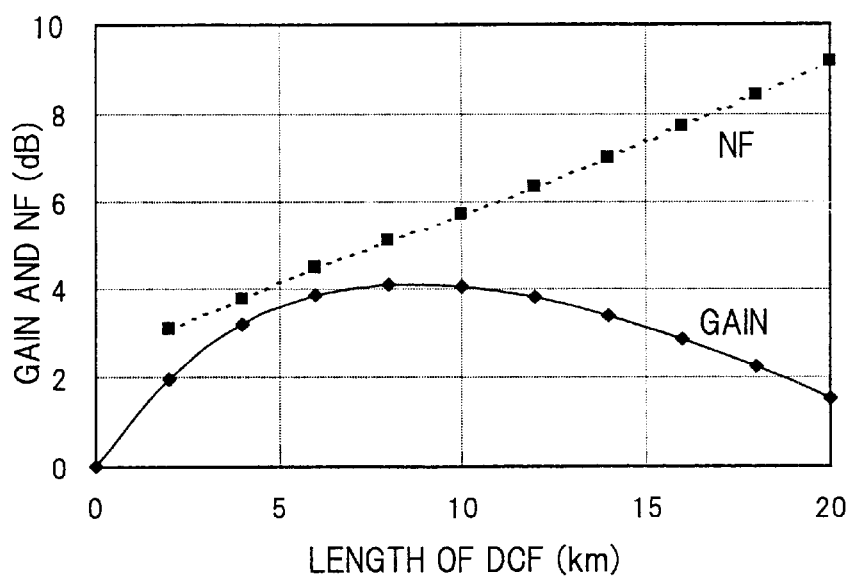
FIG. 6 is a diagram showing an example of a Raman gain and a noise factor, to be obtained by changing the length of DCF while holding a pumping light power to be constant, for a single-staged DCFRA.

FIG. 6 is a diagram showing an example of a Raman gain and a noise factor (NF), to be obtained when changing the length of the DCF while holding a pumping light power to be constant, for the single-staged DCFRA 30 as used in the first embodiment or second embodiment. As understood from FIG. 6, the gain of the single-staged DCFRA 30 is changed depending on the length of the DCF, and there exists an optimum length for obtaining the maximum gain. Thus, in a case where the length of DCF required to compensate for the dispersion of the optical fiber transmission path 2 is increased, it is possible to obtain a higher gain by dividing the constitution of DCFRA into two or more stages.

Figure 7:
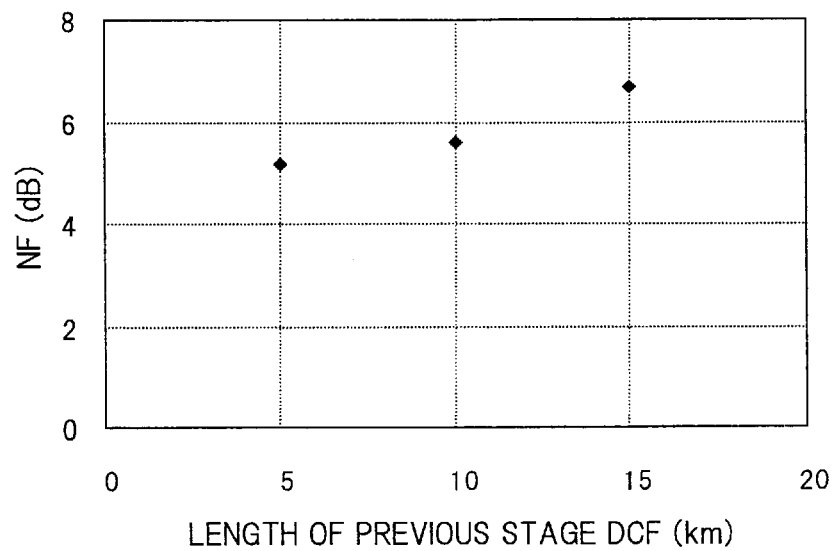
FIG. 7 is a diagram showing an example of a noise factor to be obtained when a ratio between DCF lengths at former and latter stages is changed under the condition that a total pumping light output power is constant, for a two-staged DCFRA.

FIG. 7 is a diagram showing an example of a noise factor (NF) to be obtained when a length ratio between the DCF $31_1$ and DCF $31_2$ in the two-staged DCFRA 30A is changed under the conditions that a total pumping light output power is constant, in a case where the total length of the former stage DCF $31_1$ and latter stage DCF $31_2$ is fixed at 20 km. In the setting as shown in FIG. 7, there can be obtained a better amplifying characteristic by setting the lengths of the former stage DCF $31_1$ and latter stage DCF $31_2$ at 5 km and 15 km, respectively. Note, the length ratio between the DCFs $31_1$ and $31_2$ is not limited to the aforementioned example, and can be appropriately set corresponding to a system structure.

Figure 8:
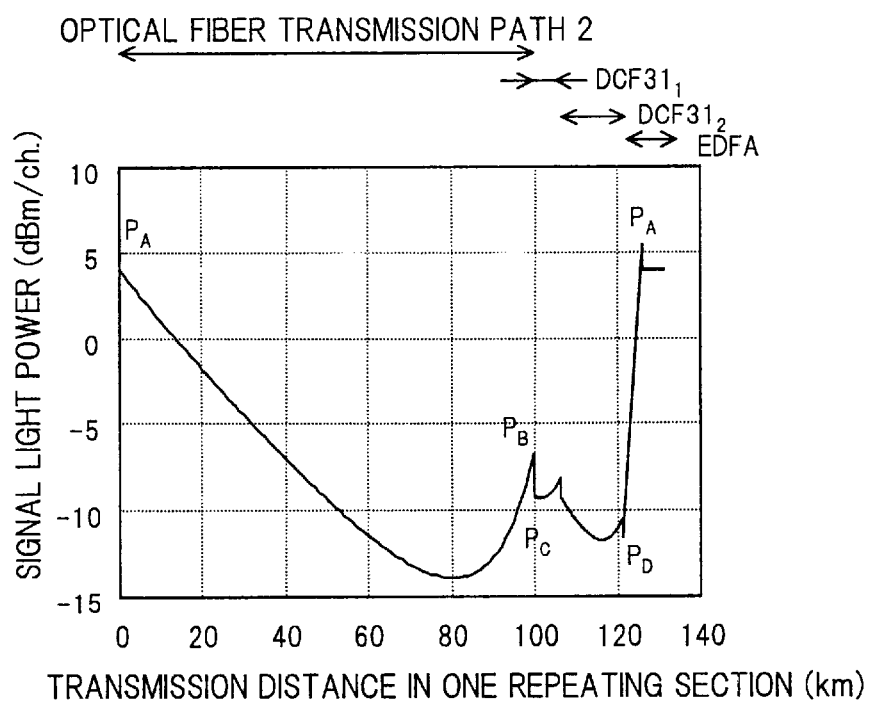
FIG. 8 is a diagram showing an example of a level diagram for one repeating section in the third embodiment.

In the WDM optical transmission system provided with the optical repeater 4A having the two-staged DCFRA 30A in each repeating section, the optical powers at signal light input/output points $P_A$ and $P_B$ of the optical fiber transmission path 2, the optical power at the signal light input point $P_C$ of the DCF $31_1$, the optical power at the signal light output point $P_C'$ of the DCF $31_1$, i.e., the signal light input point $P_C'$ of the DCF $31_2$, and the optical power at the signal light output point $P_D$ of the DCF $31_2$ are monitored in each repeating section, similarly to the second embodiment. Then, the pumping light powers output from the pumping light source 11 of the DRA 10 and from the pumping light sources $32_1$ and $32_2$ of the DCFRA 30A are feedback controlled by the controlling circuits 17, 38, respectively, and the amplifying operation of the EDFA 40 is feedback controlled by the controlling circuit 17 of the DRA 10 at the next stage, so that the signal light powers at the points $P_A$ to $P_D$ approach the control target values capable of bringing the nonlinear phase shift amount $\Delta\phi_{NL}$ caused in one repeating section to a previously set value or less, and also ensuring the maximum OSNR. In this way, the gains of the DRA 10, two-staged DCFRA 30A and EDFA 40 are optimized, to thereby effectively suppress the occurrence of nonlinear optical effect accompanied by the Raman amplifications. In FIG. 8, there is shown an example of a level diagram in one repeating section, when the aforementioned control is performed for this embodiment.

According to the WDM optical transmission system of the third embodiment, since the system is constituted by using the optical repeater 4A having the two-staged DCFRA 30A, it becomes possible to obtain the same effect as the second embodiment and to realize an excellent amplifying characteristic even in a case where the DCF length is increased.

Figure 9:
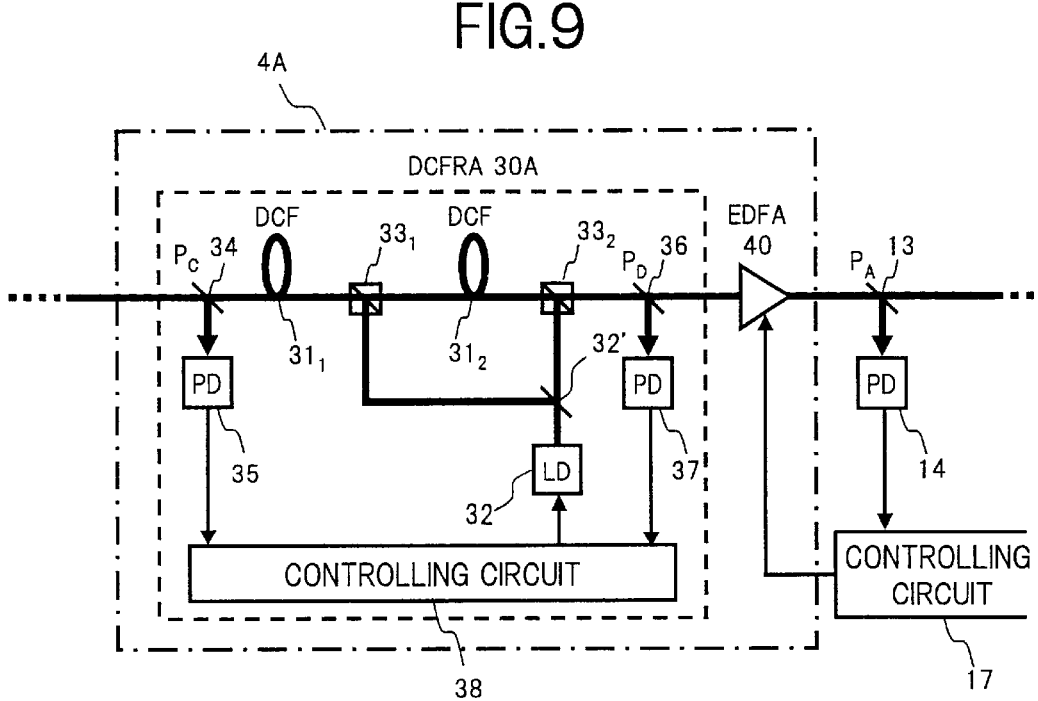
FIG. 9 is a diagram showing another constitution of the two-staged DCFRA, for the third embodiment.
Figure 10:
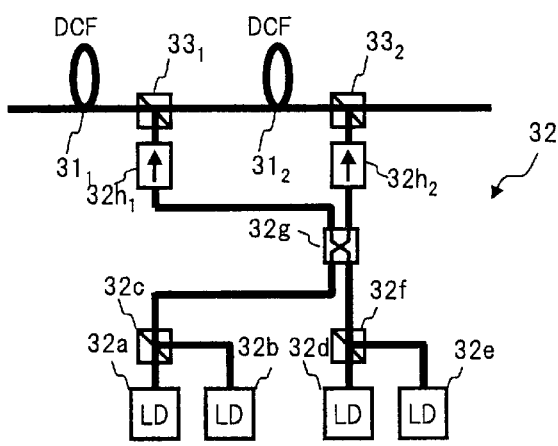
FIG. 10 is a diagram showing yet another constitution of the two-staged DCFRA, for the third embodiment.

In the third embodiment, there has been described a case for using the two-staged DCFRA 30A. However, it is of course possible to perform the discrete Raman amplification, by a three or more-staged structure. Further, the individual pumping light sources $32_1$ and $32_2$ have been provided corresponding to the DCFs $31_1$, $31_2$ at former and latter stages in the two-staged DCFRA 30A. However, as shown in FIG. 9, it is possible to bifurcate the pumping light to be output from a single pumping light source 32 into two pumping lights by the demultiplexer 32', to supply the pumping lights to the DCFs $31_1$ and $31_2$ via the multiplexers $33_1$ and $33_2$, respectively. It is also possible to supply the pumping lights multiplexed and then demultiplexed by combining a plurality of pumping light sources to the DCFs $31_1$, $31_2$, respectively, as shown in FIG. 10. In the exemplary constitution of FIG. 10, pumping lights output from two pumping light sources 32a and 32b are multiplexed by a polarization beam splitter (PBS) 32c, and pumping lights output from the other two pumping light sources 32d and 32e are multiplexed by a PBS 32f, so that the output lights from the PBSs 32c and 32f are multiplexed and then bifurcated into two pumping lights by an optical coupler 32g, and the obtained pumping lights are sent to the multiplexers $33_1$ and $33_2$ via optical isolators $32h_1$ and $32h_2$, respectively. Application of such a pumping light source constitution enables to supply pumping lights of equalized wavelengths having increased powers to the DCFs $31_1$ and $31_2$, respectively.

There will be described hereinafter a WDM optical transmission system according to a fourth embodiment of the present invention.

In the WDM optical transmission system of the fourth embodiment, there shall be considered such a constitution in which the amplification of signal light is performed for each wavelength band in each optical repeater, in a case where the WDM signal light to be transmitted include a plurality of wavelength bands, specifically, for example, in a case where the WDM signal light includes, optical signals in a Conventional band (C-band) with a wavelength range for approximately 1530 to 1565 nm and a Long wavelength band (L-band) with a wavelength range for approximately 1565 to 1625 nm. Herein, there shall be described, as one example, the WDM signal light including the two wavelength bands of C-band and L-band. However, the present invention is not limited thereto, and can be similarly applied to the WDM signal light including other wavelength bands than the aforementioned two bands, or including three or more wavelength bands.

Figure 11:
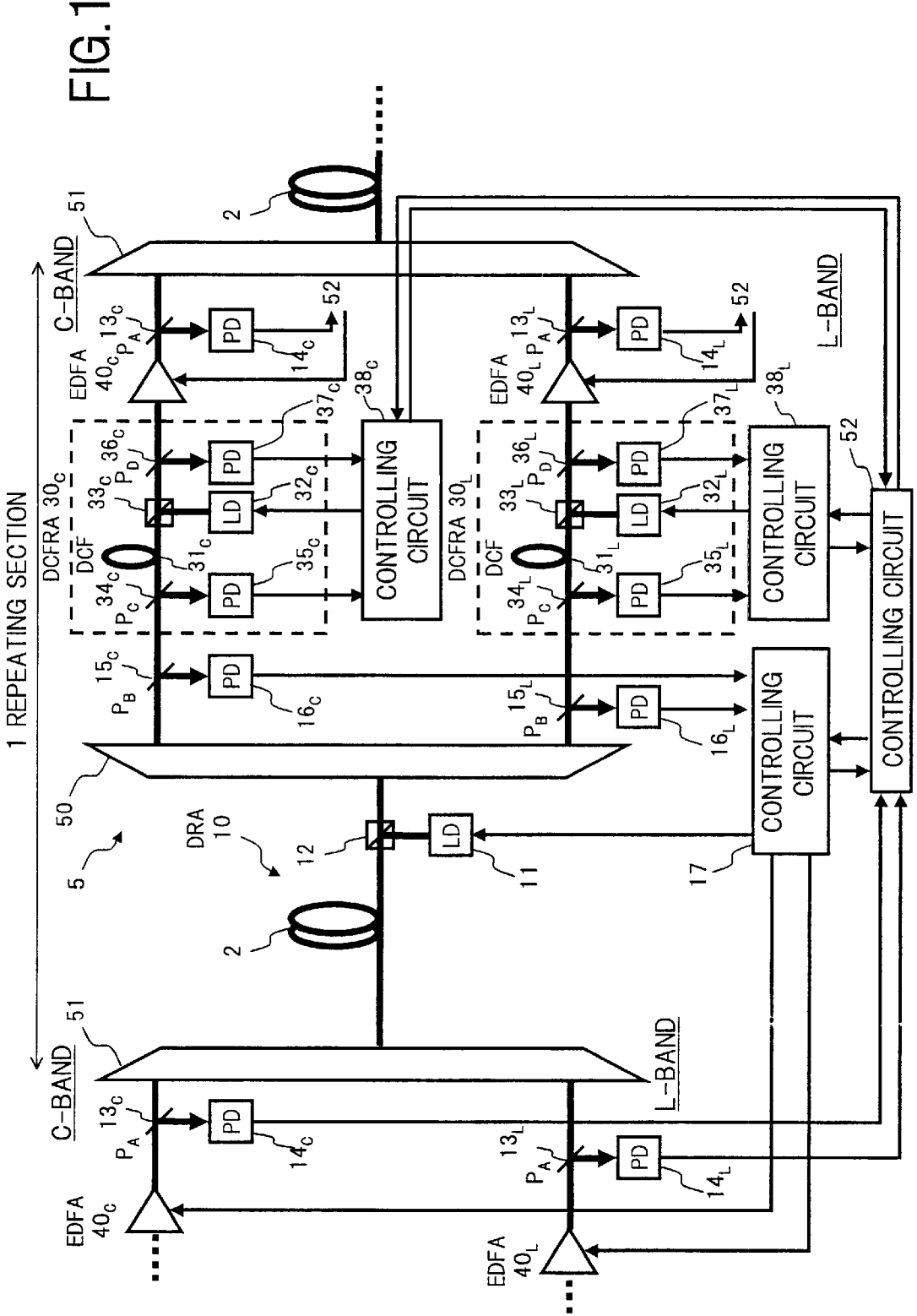
FIG. 11 is a block diagram showing an essential constitution of a WDM optical transmission system according to a fourth embodiment of the present invention.

FIG. 11 is a block diagram showing an essential constitution of the WDM optical transmission system according to the fourth embodiment.

In FIG. 11, the WDM optical transmission system of this embodiment is constituted such that, for the system structure of the second embodiment, instead of the optical repeater 4 of each repeating section, there is provided an optical repeater 5 having amplifying constitutions individually corresponding to the C-band and L-band. The constitutions of portions other than the above are the same as the second embodiment.

The optical repeater 5 in each repeating section includes a demultiplexer 50 for demultiplexing the WDM signal light having been subjected to the distributed Raman amplification by the optical fiber transmission path 2, into optical signals in the C-band and L-band, and a multiplexer 51 for multiplexing the optical signals that have been once demultiplexed into the optical signals in the respective bands, to output to the optical fiber transmission path 2 in the next repeating section. Further, a DCFRA $30_C$ and EDFA $40_C$ for C-band are disposed on an optical path corresponding to the C-band between the demultiplexer 50 and multiplexer 51, and a DCFRA $30_L$ and EDFA $40_L$ for L-band are disposed on an optical path corresponding to the L-band between the demultiplexer 50 and multiplexer 51.

Note, the constitutions of the DCFRAs $30_C$ and $30_L$, and EDFAs $40_C$ and $40_L$ corresponding to the respective bands are the same as those of the DCFRA 30 and EDFA 40 used in the second embodiment, and the corresponding components in the fourth embodiment are designated by the same reference numerals as the second embodiment while added with a subscript of the corresponding band to each reference numeral.

Further, there shall be considered the signal light input/output points $P_A$ and $P_B$ of the optical fiber transmission path 2, for each of the C-band and L-band. Specifically, as the signal light input point $P_A$ of the optical fiber transmission path 2 for the C-band, there is provided a demultiplexer $13_C$ between an output end of the EDFA $40_C$ and a C-band input port of the multiplexer 51 at the former stage repeating section, and the light demultiplexed by the demultiplexer $13_C$ is sent to a light receiver $14_C$, so as to monitor an optical power at the signal light input point $P_A$ at the C-band side. For the L-band, there is provided a demultiplexer $13_L$ between an output end of the EDFA $40_L$ and an L-band input port of the multiplexer 51 at the former stage repeating section, and the light demultiplexed by the demultiplexer $13_L$ is sent to a light receiver $14_L$, so as to monitor an optical power at the signal light input point $P_A$ at the L-band side. The output signals from the light receivers $14_C$ and $14_L$ are sent to a controlling circuit 52.

As the signal light output point $P_B$ of the optical fiber transmission path 2 for the C-band, there is provided a demultiplexer $15_C$ between a C-band output port of the demultiplexer 50 and an input end of the DCFRA $30_C$, and the light demultiplexed by the demultiplexer $15_C$ is sent to a light receiver $16_C$, so as to monitor an optical power at the signal light output point $P_B$ at the C-band side. For the L-band, there is provided a demultiplexer $15_L$ between an L-band output port of the demultiplexer 50 and an input end of the DCFRA $30_L$, and the light demultiplexed by the demultiplexer $15_L$ is sent to a light receiver $16_L$, so as to monitor an optical power at the signal light output point $P_B$ at the L-band side. The output signals from the light receivers $16_C$ and $16_L$ are sent to the controlling circuit 17 of the DRA 10.

The controlling circuit 52 is notified of the signal light powers at the points $P_B$ to $P_D$ to be obtained at the controlling circuit 17 of the DRA 10 and controlling circuits $38_C$ and $38_L$ of the DCFRAs $30_C$ and $30_L$, and is input with output signals from the light receivers $14_C$ and $14_L$ positioned at the former stage repeating section, to thereby obtain the signal light power at the signal light input points $P_A$ of the optical fiber transmission path 2 at the own stage. The controlling circuit 52 then generates controlling signals for rendering the monitored values of the signal light powers at the points $P_A$ to $P_D$ to approach previously set control target values, to send these controlling signals to the controlling circuits 17, $38_C$ and $38_L$.

In the WDM optical transmission system having the aforementioned constitution, in each repeating section, the WDM signal light that has been propagated through the optical fiber transmission path 2 to be subjected to the distributed Raman amplification, is demultiplexed by the demultiplexer 50 of the optical repeater 5 into optical signals in the C-band and L-band, and the optical signals in the respective bands are amplified by the DCFRA $30_C$ and EDFA $40_C$, and by the DCFRA $30_L$ and EDFA $40_L$, respectively, and then multiplexed by the multiplexer 51 to be output to the latter stage optical fiber transmission path 2. At this time, the monitored values at the signal light input/output points $P_A$ and $P_B$ of the optical fiber transmission path 2 corresponding to the respective bands and the monitored values at the signal light input/output points $P_C$ and $P_D$ of DCFs $31_C$ and $31_L$ corresponding to the respective bands, are collectively sent to the controlling circuit 52, and the amplifying operations of the DRA 10, DCFRAs $30_C$ and $30_L$, and EDFAs $40_C$ and $40_L$ are feedback controlled by the controlling circuits 17, $38_C$ and $38_L$ so that the above monitored values approach the control target values, respectively.

In this way, according to the WDM optical transmission system of the fourth embodiment, the controlling operations corresponding to the respective bands are performed even in a case where there is used the optical repeater 5 having a constitution for demultiplexing the WDM signal light into signal lights in the C-band and L-band so as to separately amplify the signal lights in the respective bands. Thus, it is possible to obtain an excellent OSNR while avoiding an increase in nonlinear optical effect accompanied by the Raman amplification in the entire system, and also to ensure excellent transmission qualities in all of the bands.

In the fourth embodiment, there has been considered a system structure corresponding to the C-band and L-band, for the aforementioned second embodiment. However, the present invention is not limited thereto, and it is possible to similarly modify the constitutions of the first embodiment shown in FIG. 1 and the constitution of the third embodiment shown in FIG. 5, FIG. 9 and FIG. 10, so as to correspond to the C-band and L-band. Moreover, there has been described the constitution where the signal lights in the C-band and L-band are subjected to the discrete Raman amplification. However, the present invention is not limited thereto, and can be applied to such a constitution for performing the concentrating Raman amplification on the signal light in either the C-band or the L-band.

There will be described hereinafter a WDM optical transmission system according to a fifth embodiment of the present invention.

Generally, It is known that, when performing the Raman amplification, it is possible to realize a constant output light level or a constant gain in the gain band, by preparing a greater number of pumping light sources to optimally control the wavelengths of the respective pumping light sources. However, the Raman amplifier provided with such a greater number of pumping light sources involves an increased size and a high cost. Therefore, in the WDM optical transmission system of the fifth embodiment, there will be described an applied example for enabling to realize a flattened level of WDM signal light after transmitted through one repeating section, by restricting the number of pumping light sources per one unit of distributed Raman amplifier and per one unit of discrete Raman amplifier, and by setting the wavelengths of the pumping light sources used in the respective Raman amplifiers to be different from one another.

Figure 12:
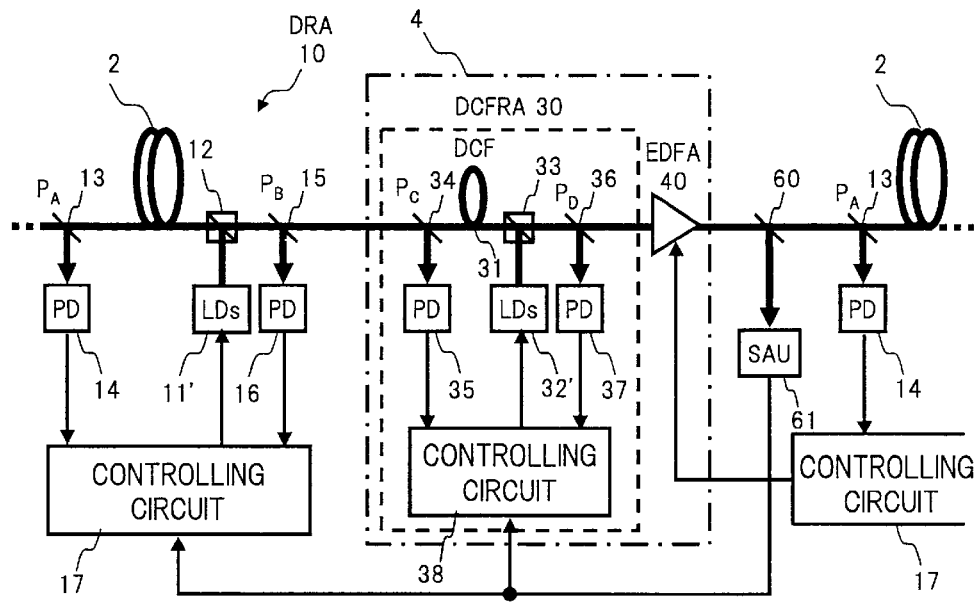
FIG. 12 is a block diagram showing an essential constitution of a WDM optical transmission system according to a fifth embodiment of the present invention.

FIG. 12 is a block diagram showing an essential constitution of the WDM optical transmission system of the fifth embodiment.

In FIG. 12, the WDM optical transmission system of this embodiment is constituted such that, for example, for the system structure of the second embodiment shown in FIG. 4, instead of the pumping light sources 11 and 32 of the DRA 10 and DCFRA 30 of each repeating section, there are provided pumping light source sections (LDs) 11' and 32' each including combined multiple pumping light sources. In this embodiment, there are additionally provided a demultiplexer 60 and a spectrum analyzing unit (SAU) 61 for monitoring the spectrum of the WDM signal light to be output from the optical repeater 4, and the monitored result at the SAU 61 is notified to the controlling circuits 17 and 38 of the DRA 10 and DCFRA 30, to thereby control the setting of pumping lights at the DRA 10 and DCFRA 30 in accordance with the actual amplifying state of the WDM signal light. The constitution of portions other than the above are the same as the second embodiment.

Figure 13:
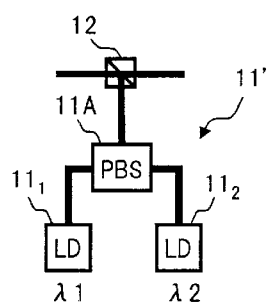
FIG. 13 is a diagram showing an example of a pumping light source section of a DRA to be used in the fifth embodiment.

For example, as shown in FIG. 13, the pumping light source section 11' of the DRA 10 includes two pumping light sources $11_1$ and $11_2$ of different wavelengths, and a polarization beam splitter (PBS) 11A, so that a pumping light of wavelength λ1 output from the pumping light source $11_1$ and a pumping light of wavelength λ2 output from the pumping light source $11_2$ are multiplexed by the PBS 11A, to be supplied to the optical fiber transmission path 2 via the multiplexer 12.

Figure 14:
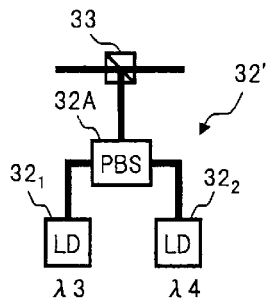
FIG. 14 is a diagram showing an example of a pumping light source section of a DCFRA to be used in the fifth embodiment.

For example, as shown in FIG. 14, the pumping light source section 32' of the DCFRA 30 includes two pumping light sources $32_1$ and $32_2$ of different wavelengths, and a polarization beam splitter (PBS) 32A, so that a pumping light of wavelength λ3 output from the pumping light source $32_1$ and a pumping light of wavelength λ4 output from the pumping light source $32_2$ are multiplexed by the PBS 32A, to be supplied to the DCF 31 via the multiplexer 33.

The demultiplexer 60 is inserted, for example, into a position between an output end of the optical repeater 4, and the signal light input point $P_A$ of the optical fiber transmission path 2 of the latter stage repeating section, and demultiplexes a part of the WDM signal light output from the optical repeater 4 to output the demultiplexed light to the SAU 61. The SAU 61 is a known analyzing unit capable of monitoring the spectrum of the light demultiplexed by the demultiplexer 60. The monitored result of the SAU 61 is output to the controlling circuit 17 of the DRA 10 and to the controlling circuit 38 of the DCFRA 30 in the same repeating section as the SAU 61.

Figure 15:
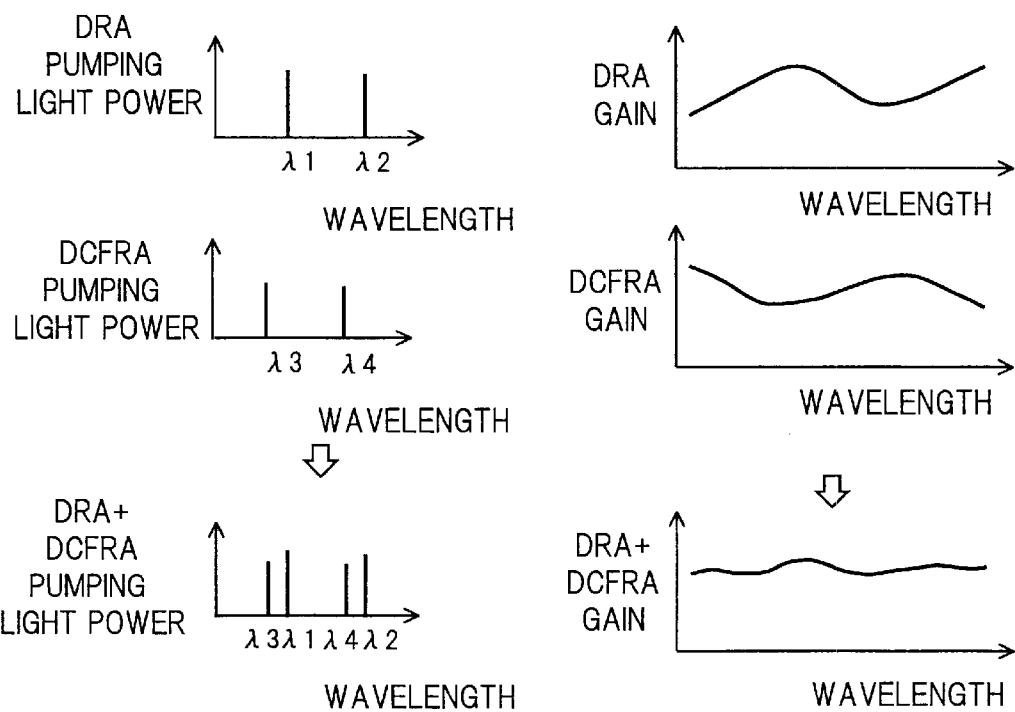
FIG. 15 is a diagram for explaining gain wavelength characteristics of the DRA and DCFRA in the fifth embodiment.

In the WDM optical transmission system having the aforementioned constitution, in each repeating section, the control for realizing gain characteristics of the DRA 10 and DCFRA 30 such as shown in FIG. 15 is performed, in addition that the amplifying conditions of the DRA 10, DCFRA 30 and EDFA 40 are controlled, so that monitored values of signal light powers at points $P_A$ to $P_D$ approach the control target values, respectively.

Namely, in the DRA 10, a Raman gain relative to a wavelength shown at the upper right of FIG. 15 is obtained, by the combination of pumping lights of wavelengths λ1 and λ2 having the powers shown at the upper left of FIG. 15. For the gain characteristic in the DRA 10, it is assumed that the wavelengths λ1 and λ2 of both pumping lights and the optical powers thereof have been set, so that a certain wavelength flatness is realized. Meanwhile, in the DCFRA 30, a Raman gain relative to a wavelength shown at the middle right of FIG. 15 is obtained, by the combination of pumping lights of wavelengths λ3 and λ4 having the powers shown at the middle left of FIG. 15. The gain characteristic of the DCFRA 30 is realized, by setting and controlling the optical powers of both pumping lights of wavelengths λ3 and λ4 so as to have a gain characteristic reverse to that of the former stage DRA 10. As shown at the bottom of FIG. 15, the gain characteristic to be obtained by combining the Raman gains of the DRA 10 and DCFRA 30 as described above realizes a substantially flat characteristic in which the individual wavelength dependencies in the DRA 10 and DCFRA 30 are nullified.

To stably obtain the flat gain characteristic based on the combination of DRA 10 and DCFRA 30 as described above, the spectrum of the WDM signal light to be actually output from the optical repeater 4 is monitored by the demultiplexer 60 and SAU 61, so that the processing for reflecting the monitored result to the control of the pumping lights of the DRA 10 and DCFRA 30 is executed by the controlling circuits 17 and 38.

According to the WDM optical transmission system of the fifth embodiment, the multiple pumping light sources of different wavelengths are used for the DRA 10 and DCFRA 30 in each repeating section, and the pumping lights are set and controlled so that the individual wavelength dependencies of the Raman gains in the DRA 10 and DCFRA 30 are nullified. Thus, it becomes possible to flatten the Raman gain in one repeating section, by the combination of the DRA 10 and the DCFRA 30 of the optical repeater 4, both having a relatively small number of pumping light sources. Further, the spectrum of the WDM signal light actually output from the optical repeater 4 is monitored, to perform the control of pumping lights reflecting the monitored result. Thus, it becomes possible to control the pumping lights more stably, to thereby further improve the transmission quality.

In the fifth embodiment, there have been combined two pumping light sources of different wavelengths, for each of the DRA 10 and DCFRA 30. However, it is also possible to combine three or more pumping light sources. Further, in the fifth embodiment, there has been considered the constitution for flattening the Raman gain, for the second embodiment. However, the present invention is not limited thereto, and can be similarly applied to any of the aforementioned embodiments.

Figure 16:
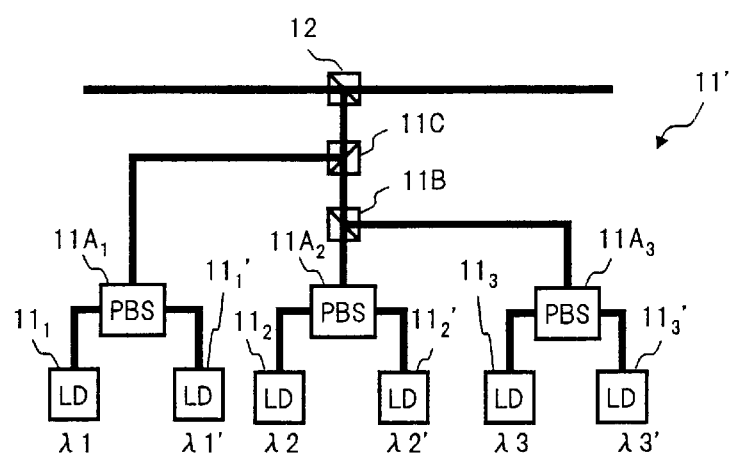
FIG. 16 is a diagram showing an example of a pumping light source section of a DRA when applied to a system structure corresponding to C-band and L-band, for the fifth embodiment.

For example, there shall be briefly described a case for flattening the Raman gain similarly to the fifth embodiment, for the fourth embodiment corresponding to the C-band and L-band shown in FIG. 11. In this case, for example, as shown in FIG. 16, a pumping light source section 11' to be used for the DRA 10 in each repeating section, is constituted to include six pumping light sources $11_1$, $11_1'$, $11_2$, $11_2'$, $11_3$ and $11_3'$, three polarization beam splitters (PBSs) $11A_1$, $11A_2$ and $11A_3$, and two multiplexers 11B and 11C. The multiplexer 11B multiplexes pumping lights of wavelengths λ2 and λ2' that have been output from the pumping light sources $11_2$ and $11_2'$ and have been multiplexed by the PBS $11A_2$, and pumping lights of wavelengths λ3 and λ3' that have been output from the pumping light sources $11_3$ and $11_3'$ and have been multiplexed by the PBS $11A_3$. Further, the multiplexer 11C multiplexes an output light from the multiplexer 11B, and pumping lights that have been output from the pumping light sources $11_1$ and $11_1'$ and have been multiplexed by the PBS $11A_1$, so that the multiplexed light is supplied to the optical fiber transmission path 2 via the multiplexer 12.

Figure 17:
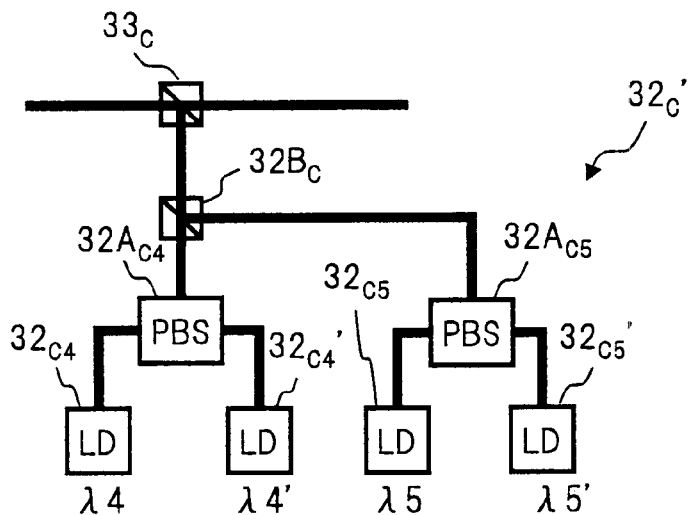
FIG. 17 is a diagram showing an example of a pumping light source section of a DCFRA for C-band when applied to the system structure corresponding to C-band and L-band, for the fifth embodiment.

Further, for example, as shown in FIG. 17, a pumping light source section $32_C'$ to be used for the DCFRA $30_C$ for C-band, is constituted to include four pumping light sources $32_{C4}$, $32_{C4}'$, $32_{C5}$ and $32_{C5}'$, two polarization beam splitters (PBSs) $32A_{C4}$ and $32A_{C5}$, and a multiplexer $32B_C$. The multiplexer $32B_C$ multiplexes pumping lights of wavelengths λ4 and λ4' that have been output from the pumping light sources $32_{C4}$ and $32_{C4}'$, and have been multiplexed by the PBS $32A_{C4}$, and pumping lights of wavelengths λ5 and λ5' that have been output from the pumping light sources $32_{C5}$ and $32_{C5}'$, and have been multiplexed by the PBS $32A_{C5}$, so that the multiplexed light is supplied to the DCF $31_C$ via the multiplexer $33_C$.

Figure 18:
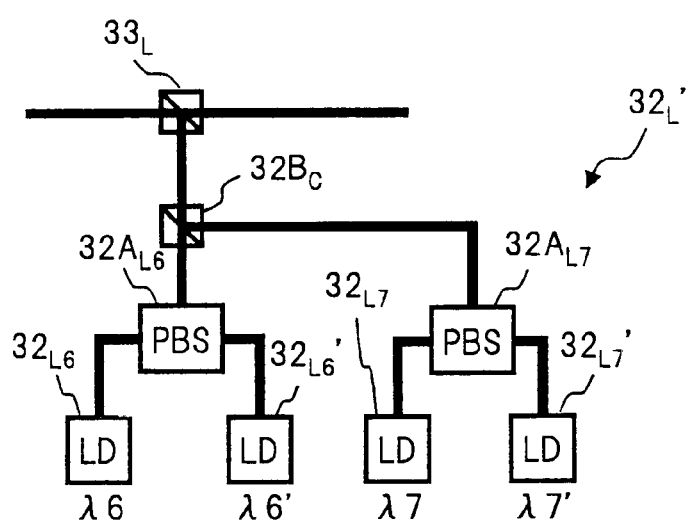
FIG. 18 is a diagram showing an example of a pumping light source section of a DCFRA for L-band when applied to the system structure corresponding to C-band and L-band, for the fifth embodiment.

For example, as shown in FIG. 18, a pumping light source section $32_L'$ to be used for the DCFRA $30_L$ for L-band, is constituted to include four pumping light sources $32_{L6}$, $32_{L6}'$, $32_{L7}$ and $32_{L7}'$, two polarization beam splitters (PBSs) $32A_{L6}$ and $32A_{L7}$, and a multiplexer $32B_L$. The multiplexer $32B_L$ multiplexes pumping lights of wavelengths λ6 and λ6' that have been output from the pumping light sources $32_{L6}$ and $32_{L6}'$, and have been multiplexed by the PBS $32A_{L6}$, and pumping lights of wavelengths λ7 and λ7' that have been output from the pumping light sources $32_{L7}$ and $32_{L7}'$, and have been multiplexed by the PBS $32A_{L7}$, so that the multiplexed light is supplied to the DCF $31_L$ via the multiplexer $33_L$.

Figure 19:
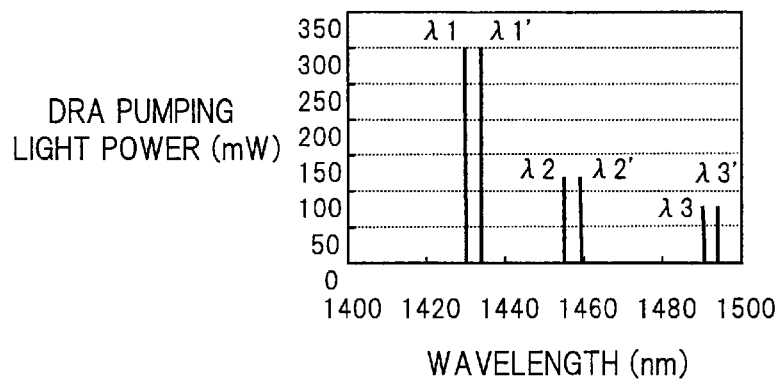
FIG. 19 is a diagram for explaining the gain wavelength characteristic of the DRA itself having the pumping light source section of FIG. 16.
Figure 19:
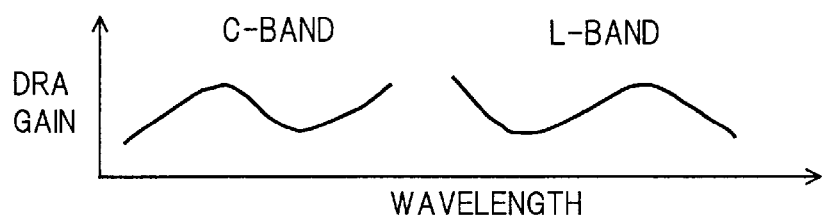
Figure 20:
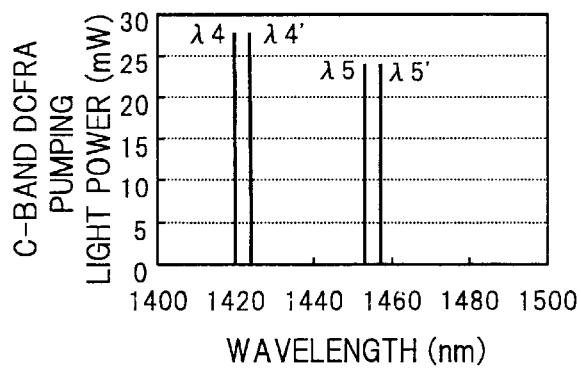
FIG. 20 is a diagram for explaining the gain wavelength characteristic of the DCFRA for C-band itself having the pumping light source section of FIG. 17, and the gain wavelength characteristic of the DCFRA for L-band itself having the pumping light source section of FIG. 18.
Figure 20:
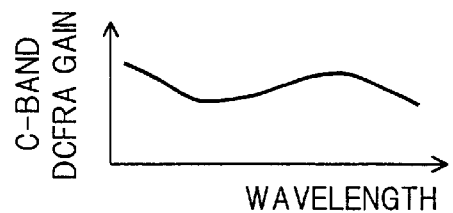
Figure 20:
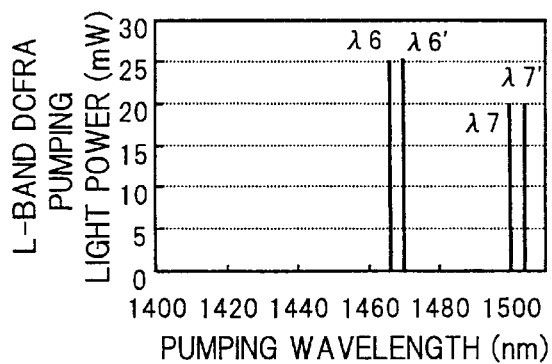
Figure 20:
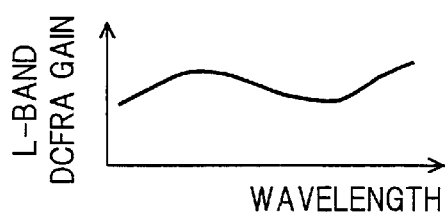
Figure 21:
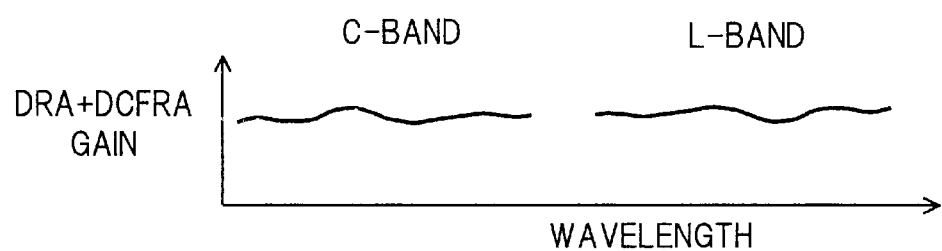
FIG. 21 is a diagram showing a characteristic obtained by combining each of the gain wavelength characteristics of FIG. 19 and FIG. 20.
Figure 22:
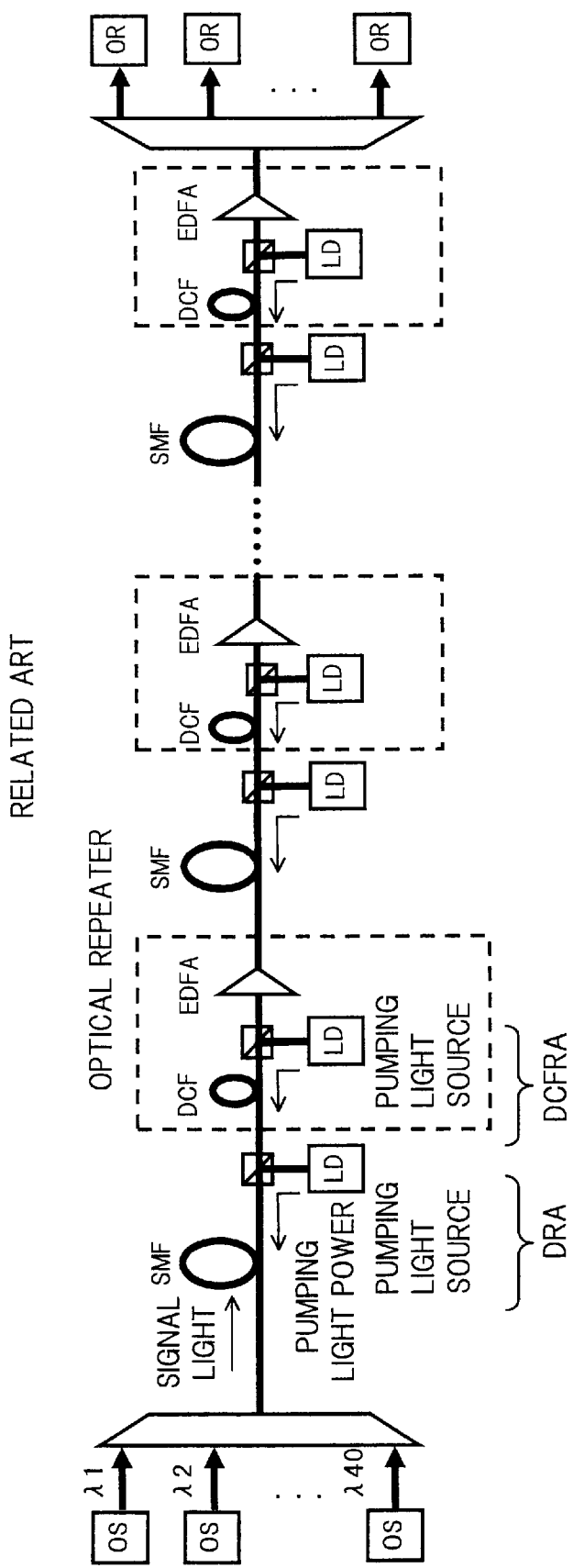
FIG. 22 is a block diagram showing an example of a conventional WDM optical transmission system using both of distributed Raman amplification and discrete Raman amplification.

In the DRA 10 having the aforementioned constitution, there can be obtained gain wavelength characteristics in the C-band and L-band in which a certain wavelength flatness as shown at the lower half of FIG. 19 is realized, by the combination of the pumping lights of wavelengths λ1, λ1', λ2, λ2', λ3 and λ3' having powers as shown at the upper half of FIG. 19. Further, in the DCFRA $30_C$ for C-band, there can be obtained a Raman gain having a characteristic reverse to the gain wavelength characteristic at the C-band side of the DRA 10 as shown at the upper right of FIG. 20, by the combination of the pumping lights of wavelengths λ4, λ4', λ5 and λ5' having powers as shown at the upper left of FIG. 20. Moreover, in the DCFRA $30_L$ for L-band, there can be obtained a Raman gain having a characteristic reverse to the gain wavelength characteristic at the L-band side of the DRA 10 as shown at the lower right of FIG. 20, by the combination of the pumping lights of wavelengths λ6, λ6', λ7 and λ7' having powers as shown at the lower left of FIG. 20. As shown in FIG. 21, the gain characteristic to be obtained by combining the individual Raman gains of the DRA 10, and DCFRAs $30_C$ and $30_L$ realizes a substantially flat characteristic in which the individual wavelength dependencies by the DRA 10, and DCFRAs $30_C$ and $30_L$ are nullified.

What is claimed is:

1. An optical transmission system utilizing Raman amplification, which comprises a distributed Raman amplifying section that supplies a pumping light to an optical fiber transmission path to Raman amplify a signal light being propagated through said optical fiber transmission path, and a discrete Raman amplifying section that supplies a pumping light to an amplifying medium within an optical transmission device connected to said optical fiber transmission path to Raman amplify a signal light being propagated through said amplifying medium, wherein said optical transmission system further comprises:
 a signal light power detecting section that detects respective signal light powers at a signal light input point to said optical fiber transmission path and a signal light output point from said optical fiber transmission path, and signal light powers at a signal light input point to the amplifying medium within said optical transmission device and a signal light output point from the amplifying medium within said optical transmission; and
 a controlling section that controls the powers or wavelengths of the pumping lights to be supplied by said distributed Raman amplifying section and said discrete Raman amplifying section, so that the signal light powers at the respective points detected by said signal light power detecting section approach control target values of signal light powers for said respective points, respectively, which bring an amount of nonlinear optical effect caused in a transmission section including said optical fiber transmission path and the amplifying medium within said optical transmission device to a previously set value or less.

2. An optical transmission system utilizing the Raman amplification according to claim 1,
wherein said controlling section sets the control target values for the signal light powers at said respective points, corresponding to the gain allocation between said distributed Raman amplifying section and said discrete Raman amplifying section, which is to maximize an optical signal-to-noise ratio within said transmission section.

3. An optical transmission system utilizing the Raman amplification according to claim 1,
wherein said optical transmission device includes an optical amplifying section that amplifies the signal light Raman amplified by said discrete Raman amplifying section, and
said controlling device controls an amplifying operation of said optical amplifying section, based on the signal light powers at said respective points.

4. An optical transmission system utilizing the Raman amplification according to claim 1,
wherein said discrete Raman amplifying section supplies a pumping light to a dispersion compensation fiber within said optical transmission device.

5. An optical transmission system utilizing the Raman amplification according to claim 1,
wherein said discrete Raman amplifying section multiplexes a plurality of pumping lights of different wavelengths, to supply the multiplexed pumping light to the amplifying medium within said optical transmission device.

6. An optical transmission system utilizing the Raman amplification according to claim 1,
wherein said discrete Raman amplifying section supplies pumping lights to a plurality of amplifying mediums within said optical transmission device, respectively, to Raman amplify signal lights being sequentially propagated through said amplifying mediums.

7. An optical transmission system utilizing the Raman amplification according to claim 6,
wherein said discrete Raman amplifying section demultiplexes a pumping light output from a common pumping light source, to supply the demultiplexed pumping lights to said plurality of amplifying mediums, respectively.

8. An optical transmission system utilizing the Raman amplification according to claim 6,
wherein said discrete Raman amplifying section multiplexes pumping lights of different wavelengths output from a plurality of pumping light sources, and then demultiplexes the multiplexed pumping light, to supply the demultiplexed pumping lights to said plurality of amplifying mediums, respectively.

9. An optical transmission system utilizing the Raman amplification according to claim 1,
wherein said optical transmission device includes a demultiplexing section that demultiplexes the signal light corresponding to a plurality of wavelength bands, respectively, and a plurality of optical paths corresponding to the signal lights in the respective wavelength bands that are demultiplexed by said demultiplexing section, and
said discrete Raman amplifying section supplies a pumping light to an amplifying medium on at least one of said plurality of optical paths, to Raman amplify the signal light being propagated through said amplifying medium.

10. An optical transmission system utilizing the Raman amplification according to claim 1,
wherein said distributed Raman amplifying section multiplexes a plurality of pumping lights of different wavelengths, to supply the multiplexed pumping light to said optical fiber transmission path.

11. An optical transmission system utilizing the Raman amplification according to claim 1,
wherein said distributed Raman amplifying section multiplexes a plurality of pumping lights of different wavelengths, to supply the multiplexed pumping light to said optical fiber transmission path,
said discrete Raman amplifying section multiplexes a plurality of pumping lights of different wavelengths, to supply the multiplexed pumping light to the amplifying medium within said optical transmission device, and
said controlling device controls the powers or wavelengths of the pumping lights, so that a gain wavelength characteristic of the Raman amplification by said discrete Raman amplifying section approaches a characteristic reverse to a gain profile of the Raman amplification by said distributed Raman amplifying section.

12. An optical transmission method utilizing the Raman amplification for supplying a pumping light to an optical fiber transmission path to perform the distributed Raman amplification on a signal light being propagated through said optical fiber transmission path, and for supplying a pumping light to an amplifying medium within an optical transmission device connected to said optical fiber transmission path to perform the discrete Raman amplification on a signal light being propagated through the amplifying medium within said optical transmission device,
wherein respective signal light powers at a signal light input point to said optical fiber transmission path and a signal light output point from said optical fiber transmission path, and signal light powers at a signal light input point to the amplifying medium within said optical transmission device and a signal light output point from the amplifying medium within said optical transmission device, are detected, and
the powers or wavelengths of the pumping lights for the distributed Raman amplification and for the discrete Raman amplification are controlled, so that the signal light powers at the detected respective points approach control target values of signal light powers for said respective points, respectively, which bring an amount of nonlinear optical effect caused in a transmission section including said optical fiber transmission path and the amplifying medium within said optical transmission device to a previously set value or less.

13. An optical transmission method utilizing the Raman amplification according to claim 12,
wherein the control target values for the signal light powers at said respective points are set, corresponding to the gain allocation between said distributed Raman amplification and said discrete Raman amplification, which is to maximize an optical signal-to-noise ratio within said transmission section.

14. An optical transmission system utilizing Raman amplification, which comprises a distributed Raman amplifying section that supplies a pumping light to an optical fiber transmission path to Raman amplify a signal light being propagated through said optical fiber transmission path, and a discrete Raman amplifying section that supplies a pumping light to an amplifying medium within an optical transmission device connected to said optical fiber transmission path to Raman amplify a signal light being propagated through said amplifying medium,
wherein said optical transmission system further comprises a controlling device that controls the supplying conditions of the pumping lights at said distributed Raman amplifying section and said discrete Raman amplifying section, based on signal light powers at a signal light input point to said optical fiber transmission path and a signal light output point from said optical fiber transmission path, and signal light powers at a signal light input point to the amplifying medium within said optical transmission device and a signal light output point from the amplifying medium within said optical transmission device, and further
wherein said optical transmission device includes a demultiplexing section that demultiplexes the signal light corresponding to a plurality of wavelength bands, respectively, and a plurality of optical paths corresponding to the signal lights in the respective wavelength bands that are demultiplexed by said demultiplexing section, and
said discrete Raman amplifying section supplies a pumping light to an amplifying medium on at least one of said plurality of optical paths, to Raman amplify the signal light being propagated through said amplifying medium.

15. An optical transmission system utilizing Raman amplification, which comprises a distributed Raman amplifying section that supplies a pumping light to an optical fiber transmission path to Raman amplify a signal light being propagated through said optical fiber transmission path, and a discrete Raman amplifying section that supplies a pumping light to an amplifying medium within an optical transmission device connected to said optical fiber transmission path to Raman amplify a signal light being propagated through said amplifying medium,
wherein said optical transmission system further comprises:
signal light power detecting means for detecting respective signal light powers at a signal light input point to said optical fiber transmission path and a signal light output point from said optical fiber transmission path, and signal light powers at a signal light input point to the amplifying medium within said optical transmission device and a signal light output point from the amplifying medium within said optical transmission device; and
controlling means for controlling the powers or wavelengths of the pumping lights to be supplied by said distributed Raman amplifying section and said discrete Raman amplifying section, so that the signal light powers at the respective points detected by said signal light power detecting means approach control target values of signal light powers for said respective points, respectively, which bring an amount of nonlinear optical effect caused in a transmission section including said optical fiber transmission path and the amplifying medium within said optical transmission device to a previously set value or less.

16. An optical transmission system comprising:
a distributed Raman amplifying section that supplies a pumping light to an optical fiber transmission path to Raman amplify a signal light being propagated through said optical fiber transmission path;
a discrete Raman amplifying section that supplies a pumping light to an amplifying medium within an optical transmission device connected to said optical fiber transmission path to Raman amplify a signal light being propagated through said amplifying medium;

a signal light power detecting section that detects respective signal light powers at a signal light input point to said optical fiber transmission path and a signal light output point from said optical fiber transmission path, and signal light powers at a signal light input point to the amplifying medium within said optical transmission device and a signal light output point from the amplifying medium within said optical transmission device; and a controlling section that controls the powers or wavelengths of the pumping lights to be supplied by said distributed Raman amplifying section and said discrete Raman amplifying section, so that the signal light powers at the respective points detected by said signal light power detecting section approaches control target values of signal light powers for said respective points, respectively, which bring an amount of nonlinear optical effect caused in a transmission section including said optical fiber transmission path and the amplifying medium within said optical transmission device to a previously set value or less.

* * * * *

UNITED STATES PATENT AND TRADEMARK OFFICE
CERTIFICATE OF CORRECTION

PATENT NO. : 6,741,389 B2  
DATED : May 25, 2004  
INVENTOR(S) : Junichi Kumasako et al.

It is certified that error appears in the above-identified patent and that said Letters Patent is hereby corrected as shown below:

Column 19,
Line 55, after "transmission", please insert -- device --.

Signed and Sealed this

Twenty-first Day of September, 2004

JON W. DUDAS
*Director of the United States Patent and Trademark Office*